(12) United States Patent
Chen et al.

(10) Patent No.: US 11,025,372 B2
(45) Date of Patent: Jun. 1, 2021

(54) SEMI-PERSISTENT SCHEDULING MANAGEMENT IN NEW RADIO

(71) Applicant: QUALCOMM Incorporated, San Diego, CA (US)

(72) Inventors: Wanshi Chen, San Diego, CA (US); Peter Pui Lok Ang, San Diego, CA (US); Peter Gaal, San Diego, CA (US); Juan Montojo, San Diego, CA (US); Tao Luo, San Diego, CA (US); Heechoon Lee, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/171,035

(22) Filed: Oct. 25, 2018

(65) Prior Publication Data

US 2019/0132092 A1    May 2, 2019

Related U.S. Application Data

(60) Provisional application No. 62/577,696, filed on Oct. 26, 2017, provisional application No. 62/582,007, filed on Nov. 6, 2017.

(51) Int. Cl.
*H04L 1/18* (2006.01)
*H04L 5/00* (2006.01)
(Continued)

(52) U.S. Cl.
CPC .......... *H04L 1/1887* (2013.01); *H04L 1/1812* (2013.01); *H04L 1/1854* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 8,320,319 B2 * 11/2012 Lohr ..................... H04L 1/1607
370/329
10,693,620 B2 * 6/2020 Zhou ................. H04W 72/0453
(Continued)

FOREIGN PATENT DOCUMENTS

| WO | WO-2016117928 A1 | 7/2016 | |
| WO | WO2017/166260 A1 * | 10/2017 | ............ H04W 72/04 |
| WO | WO-2017166260 A1 | 10/2017 | |

OTHER PUBLICATIONS

3GPP TSG RAN WG1 Meeting 90bis, R1-1717663, Prague, CZ, Oct. 9-13, 2017, Agenda item: 7.3.3.2, Source Samsung, Title HARQ Management and Feedback.*
(Continued)

*Primary Examiner* — Peter G Solinsky
*Assistant Examiner* — Sanjay K Dewan
(74) *Attorney, Agent, or Firm* — Linda G. Gunderson; Holland & Hart LLP

(57) ABSTRACT

Methods, systems, and devices for wireless communications are described. In one example, a method includes receiving signaling from a base station to activate a semi-persistent scheduling (SPS) configuration for transmission between the base station and the UE, and receiving a hybrid automatic repeat request (HARQ) timing for downlink transmissions based at least in part on the SPS configuration being activated. In another example, the method includes establishing a connection with a base station using a component carrier (CC), the CC having a plurality of bandwidth parts (BWPs), receiving signaling that indicates an SPS configuration or other types of pre-configured resources associated with at
(Continued)

least a first BWP of the plurality of BWPs and transmitting or receiving using at least the first BWP according to the SPS configuration or other types of pre-configured resources associated with at least the first BWP.

23 Claims, 19 Drawing Sheets

(51) Int. Cl.
*H04W 72/12* (2009.01)
*H04W 76/27* (2018.01)
*H04W 72/04* (2009.01)

(52) U.S. Cl.
CPC .......... *H04L 1/1861* (2013.01); *H04L 1/1893* (2013.01); *H04L 1/1896* (2013.01); *H04L 5/0055* (2013.01); *H04W 72/042* (2013.01); *H04W 72/1205* (2013.01); *H04W 76/27* (2018.02); *H04L 5/001* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2011/0128896 A1* | 6/2011 | Huang | .................. | H04L 1/1887 370/280 |
| 2012/0044891 A1* | 2/2012 | Yang | ....................... | H04L 47/36 370/329 |
| 2012/0069805 A1* | 3/2012 | Feuersanger | ..... | H04W 72/1268 370/329 |
| 2012/0155416 A1* | 6/2012 | Zhang | .................. | H04W 72/04 370/329 |
| 2014/0092829 A1* | 4/2014 | Han | ..................... | H04L 5/0053 370/329 |
| 2016/0381681 A1* | 12/2016 | Nogami | ............ | H04W 72/0446 370/280 |
| 2017/0149543 A1* | 5/2017 | Ang | ....................... | H04L 5/0007 |
| 2017/0310431 A1* | 10/2017 | Iyer | ....................... | H04L 1/1816 |
| 2018/0007731 A1* | 1/2018 | Park | .................... | H04W 76/15 |
| 2018/0124648 A1* | 5/2018 | Park | ................... | H04W 36/0072 |
| 2018/0145816 A1* | 5/2018 | Ahn | ....................... | H04L 1/1621 |
| 2019/0075585 A1* | 3/2019 | Deogun | ................ | H04L 5/0092 |
| 2019/0132092 A1* | 5/2019 | Chen | ................. | H04W 72/1205 |
| 2019/0149275 A1* | 5/2019 | He | ......................... | H04L 5/0064 370/329 |
| 2020/0053777 A1* | 2/2020 | Babaei | ................ | H04W 72/042 |

OTHER PUBLICATIONS

International Search Report and Written Opinion—PCT/US2018/057779—ISA/EPO—dated Mar. 27, 2019 (180436WO).
Partial International Search Report—PCT/US2018/057779—ISA/EPO—dated Jan. 30, 2019 (180436WO).
Samsung: "HARQ Management and Feedback", 3GPP Draft; R1-1717663_HARQ Management and Feedback, 3rd Generation Partnership Project (3GPP), Mobile Competence Centre, 650, Route Des Lucioles, F-06921 Sophia-Antipolis Cedex, France, vol. RAN WG1, No. Prague, CZ; Oct. 9, 2017-Oct. 13, 2017 Oct. 8, 2017, XP051340848, Retrieved from the Internet: URL:http://www.3gpp.org/ftp/Meetings_3GPP_SYNC/RAN1/Docs/ [retrieved on Oct. 8, 2017], 5 pages.
Samsung: "HARQ-ACK Feedback Timing", 3GPP Draft; R1-1713644, 3rd Generation Partnership Project (3GPP), Mobile Competence Centre, 650, Route Des Lucioles, F-06921 Sophia-Antipolis Cedex, France, vol. RAN WG1, No. Prague, CZ; Aug. 21, 2017-Aug. 25, 2017 Aug. 20, 2017, XP051316444, Retrieved from the Internet: URL:http://www.3gpp.org/ftp/Meetings_3GPP_SYNC/RAN1/Docs/ [retrieved on Aug. 20, 2017], 3 pages.

* cited by examiner

SEMI-PERSISTENT SCHEDULING MANAGEMENT IN NEW RADIO

CROSS REFERENCES

The present Application for Patent claims the benefit of U.S. Provisional Patent Application No. 62/582,007 by CHEN, et al., entitled "SEMI-PERSISTENT SCHEDULING MANAGEMENT IN NEW RADIO," filed Nov. 6, 2017, and to U.S. Provisional Patent Application No. 62/577,696 by CHEN, et al., entitled "SEMI-PERSISTENT SCHEDULING MANAGEMENT IN NEW RADIO," filed Oct. 26, 2017, assigned to the assignee hereof, and incorporated by reference.

BACKGROUND

The following relates generally to wireless communication, and more specifically to semi-persistent scheduling (SPS) management in New Radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include several base stations or network access nodes, each simultaneously supporting communication for multiple communication devices, which may be otherwise known as user equipment (UE).

A base station may configure a UE for SPS communications by scheduling the UE to transmit uplink messages at a certain periodicity on reserved SPS resources. A UE may be configured to transmit feedback associated with downlink transmissions according to a timing latency described by a hybrid automatic repeat request (HARQ). In NR systems, the HARQ timing may be dynamically indicated by each downlink transmission. More specifically, a downlink control information (DCI) scheduling a downlink transmission may be configured to indicate a HARQ timing associated with the downlink transmission. However, in the presence of downlink transmission without a scheduling DCI, the UE may not receive a HARQ timing.

SUMMARY

The described techniques relate to improved methods, systems, devices, or apparatuses that support semi-persistent scheduling (SPS) management in New Radio (NR). For example, the described techniques provide for a wireless communications network that may support SPS for uplink and downlink communications. In some cases, SPS may be used by a base station to schedule a user equipment (UE) to transmit messages at a certain periodicity on reserved SPS resources. In NR systems, a UE may be configured to transmit an acknowledgement (ACK)/non-acknowledgement (NACK) in response to a downlink transmission according to a dynamic HARQ timing. For example, in NR systems, the HARQ timing may be dynamically indicated to a UE in a scheduling downlink control information (DCI). In some examples, the HARQ timing may be indicated using a 2-bit field in the DCI. However, in NR systems supporting SPS, there is no scheduling DCI for some SPS transmissions. In such cases, there exists a need to efficiently determine HARQ timing for transmissions without a scheduling DCI.

In one example, a UE may be configured to predetermine a HARQ timing for SPS transmissions without a scheduling DCI. In some implementations, the UE may receive an indication to initiate transmissions according to an SPS configuration. For example, as part of an SPS configuration, the base station may indicate a periodicity and resources for SPS transmissions. Upon receiving the SPS configuration, the UE may be configured to assume a predetermined HARQ timing. In some examples, the predetermined HARQ timing value may be dependent upon a UE capability. For example, the capability of a UE may be a capability of the UE to decode a received downlink transmission.

In another example, a HARQ timing for SPS transmissions without a scheduling DCI may be configured by radio resource control (RRC) signaling. In some implementations, the UE may receive an indication to initiate transmissions according to a received SPS configuration via RRC. In some examples, upon receiving the RRC signaling, the UE may be configured to set up the HARQ timing based on the RRC signaling and a capability associated with the UE. Additionally, or alternatively, a HARQ timing for SPS transmissions without a scheduling DCI may be configured by the most recent DCI activating the SPS. For example, the UE may receive a DCI from a base station indicating activation of SPS configuration for transmission between the base station and the UE. In some cases, the UE may use the HARQ timing included in the DCI not only for the downlink transmission associated with the DCI, but also for subsequent transmissions without a scheduling DCI.

In some wireless communications systems in NR, a UE may establish a connection with a base station using a component carrier (CC). The CC may include multiple bandwidth parts (BWPs), each BWP having a portion of frequency bandwidth of the CC. In some examples, the UE may receive an indication to activate a BWP. To efficiently manage SPS configuration when an active BWP is switched from one BWP that includes SPS resources to one that does not include SPS resources, the UE and the base station may use BWP dependent SPS configurations and/or activations. In some cases, the UE may be configured to receive signaling that indicates an SPS configuration or other types of pre-configured resources associated with a first BWP. The UE may then transmit or receive using the first BWP according to the received SPS configuration or other types or pre-configured resources. In some examples, upon activating a BWP, the UE may receive a DCI activating the SPS configuration associated with the active BWP.

A method of wireless communication is described. The method may include receiving signaling from a base station to activate an SPS configuration for transmissions from the UE and receiving a HARQ timing for downlink transmissions based on the SPS configuration being activated.

An apparatus for wireless communication is described. The apparatus may include means for receiving signaling from a base station to activate an SPS configuration for transmissions from the UE and means for receiving a HARQ timing for downlink transmissions based on the SPS configuration being activated.

Another apparatus for wireless communication is described. The apparatus may include a processor, memory in electronic communication with the processor, and instructions stored in the memory. The instructions may be operable to cause the processor to receive signaling from a base station to activate an SPS configuration for transmissions from the UE and receive a HARQ timing for downlink transmissions based on the SPS configuration being activated.

A non-transitory computer-readable medium for wireless communication is described. The non-transitory computer-readable medium may include instructions operable to cause a processor to receive signaling from a base station to activate an SPS configuration for transmissions from the UE and receive a HARQ timing for downlink transmissions based on the SPS configuration being activated.

Some examples of the method, apparatus, and non-transitory computer-readable medium described above may further include processes, features, means, or instructions for receiving a downlink transmission without a scheduling DCI. Some examples of the method, apparatus, and non-transitory computer-readable medium described above may further include processes, features, means, or instructions for transmitting an ACK/NACK in response to the downlink transmission according to a timing latency indicated by the received HARQ timing.

In some examples of the method, apparatus, and non-transitory computer-readable medium described above, receiving the HARQ timing may include receiving the HARQ timing via RRC signaling from the base station.

Some examples of the method, apparatus, and non-transitory computer-readable medium described above may further include processes, features, means, or instructions for receiving signaling from the base station to activate a second SPS configuration for a second set of transmissions from the UE. Some examples of the method, apparatus, and non-transitory computer-readable medium described above may further include processes, features, means, or instructions for receiving a second HARQ timing via the RRC signaling, the second HARQ timing associated with the second SPS configuration.

In some examples of the method, apparatus, and non-transitory computer-readable medium described above, the HARQ timing may be based on a capability of the UE. In some examples of the method, apparatus, and non-transitory computer-readable medium described above, the capability associated with the UE may be based on a capability profile for the UE. In some cases, the capability profile indicates a minimum value of the HARQ timing supported by the UE.

In some examples of the method, apparatus, and non-transitory computer-readable medium described above, the signaling to activate the SPS configuration may include an activation DCI.

Some examples of the method, apparatus, and non-transitory computer-readable medium described above may further include processes, features, means, or instructions for receiving the HARQ timing via the activation DCI, the activation DCI including a PDSCH.

In some examples of the method, apparatus, and non-transitory computer-readable medium described above, the received HARQ timing may be applied to the PDSCH with the activation DCI and subsequent transmissions of PDSCH without a DCI. Some examples of the method, apparatus, and non-transitory computer-readable medium described above may further include processes, features, means, or instructions for receiving a second activation DCI that includes second HARQ timing, the second HARQ timing replacing the previously received HARQ timing.

In some examples of the method, apparatus, and non-transitory computer-readable medium described above, the HARQ timing may be a function of at least one of a slot structure, or a BWP switching procedure, or a combination thereof.

In some examples of the method, apparatus, and non-transitory computer-readable medium described above, the slot structure may include an uplink transmission opportunity for transmitting an ACK/NACK in response to a downlink transmission.

In some examples of the method, apparatus, and non-transitory computer-readable medium described above, the slot structure may be dynamically indicated by at least one slot-format-indicator (SFI).

A method of wireless communication is described. The method may include receiving signaling from a base station to activate an SPS configuration for transmissions from the UE and determining, by the UE, a HARQ timing for downlink transmissions based on a capability associated with the UE.

An apparatus for wireless communication is described. The apparatus may include means for receiving signaling from a base station to activate an SPS configuration for transmissions from the UE and means for determining, by the UE, a HARQ timing for downlink transmissions based on a capability associated with the UE.

Another apparatus for wireless communication is described. The apparatus may include a processor, memory in electronic communication with the processor, and instructions stored in the memory. The instructions may be operable to cause the processor to receive signaling from a base station to activate an SPS configuration for transmissions from the UE and determine a HARQ timing for downlink transmissions based on a capability associated with the UE.

A non-transitory computer-readable medium for wireless communication is described. The non-transitory computer-readable medium may include instructions operable to cause a processor to receive signaling from a base station to activate an SPS configuration for transmissions from the UE and determine a HARQ timing for downlink transmissions based on a capability associated with the UE.

Some examples of the method, apparatus, and non-transitory computer-readable medium described above may further include processes, features, means, or instructions for receiving a downlink transmission without a scheduling DCI. Some examples of the method, apparatus, and non-transitory computer-readable medium described above may further include processes, features, means, or instructions for transmitting an ACK/NACK in response to the downlink transmission according to a timing latency indicated by the received HARQ timing.

In some examples of the method, apparatus, and non-transitory computer-readable medium described above, the capability associated with the UE may be static. In some examples of the method, apparatus, and non-transitory computer-readable medium described above, the received signaling to activate the SPS configuration may include an activation DCI.

In some examples of the method, apparatus, and non-transitory computer-readable medium described above, the capability associated with the UE may be based on a capability profile for the UE. In some cases, the capability profile indicates a minimum value of the HARQ timing supported by the UE.

In some examples of the method, apparatus, and non-transitory computer-readable medium described above, the HARQ timing may be a function of at least one of a slot structure and a BWP switching procedure.

In some examples of the method, apparatus, and non-transitory computer-readable medium described above, the slot structure may include an uplink transmission opportunity for transmitting an ACK/NACK in response to a downlink transmission. In some examples of the method, apparatus, and non-transitory computer-readable medium described above, the slot structure may be dynamically indicated by at least one SFI.

A method of wireless communication is described. The method may include establishing a connection with a base station using a CC, the CC having a plurality of BWPs, each BWP having a portion of a frequency bandwidth of the CC, receiving signaling that indicates an SPS configuration or other types of pre-configured resources associated with at least a first BWP of the plurality of BWPs, and transmitting or receiving using at least the first BWP according to the SPS configuration or other types of pre-configured resources associated with at least the first BWP.

An apparatus for wireless communication is described. The apparatus may include means for establishing a connection with a base station using a CC, the CC having a plurality of BWPs, each BWP having a portion of a frequency bandwidth of the CC, means for receiving signaling that indicates an SPS configuration or other types of pre-configured resources associated with at least a first BWP of the plurality of BWPs, and means for transmitting or receiving using at least the first BWP according to the SPS configuration or other types of pre-configured resources associated with at least the first BWP.

Another apparatus for wireless communication is described. The apparatus may include a processor, memory in electronic communication with the processor, and instructions stored in the memory. The instructions may be operable to cause the processor to establish a connection with a base station using a CC, the CC having a plurality of BWPs, each BWP having a portion of a frequency bandwidth of the CC, receive signaling that indicates an SPS configuration or other types of pre-configured resources associated with at least a first BWP of the plurality of BWPs, and transmit or receive using at least the first BWP according to the SPS configuration or other types of pre-configured resources associated with at least the first BWP.

A non-transitory computer-readable medium for wireless communication is described. The non-transitory computer-readable medium may include instructions operable to cause a processor to establish a connection with a base station using a CC, the CC having a plurality of BWPs, each BWP having a portion of a frequency bandwidth of the CC, receive signaling that indicates an SPS configuration or other types of pre-configured resources associated with at least a first BWP of the plurality of BWPs, and transmit or receive using at least the first BWP according to the SPS configuration or other types of pre-configured resources associated with at least the first BWP.

Some examples of the method described above may further include processes, features, means, or instructions for receiving signaling that indicates a SPS configuration or other types of pre-configured resources associated with at least a second BWP of the plurality of BWPs. Some examples of the method described above may further include processes, features, means, or instructions for switching from the first BWP to the second BWP. Some examples of the method described above may further include processes, features, means, or instructions for transmitting or receiving using at least the second BWP according to the SPS configuration or other types of pre-configured resources associated with at least the second BWP.

Some examples of the method described above may further include processes, features, means, or instructions for switching from the first BWP to a second BWP. Some examples of the method described above may further include processes, features, means, or instructions for determining the second BWP may be unassociated with an SPS configuration or other types of pre-configured resources. Some examples of the method described above may further include processes, features, means, or instructions for transmitting or receiving using the second BWP and without an active SPS configuration. In some examples of the method described above, the signaling may include DCI or RRC messages.

A method of wireless communication is described. The method may include establishing a connection with a UE using a CC, the CC having two or more BWPs each BWP having a portion of a frequency bandwidth of a primary CC, transmitting signaling that indicates an SPS configuration or other types of pre-configured resources associated with at least a first BWP of the plurality of BWPs, and receiving or transmitting using at least the first BWP according to the SPS configuration or other types of pre-configured resources associated with at least the first BWP.

An apparatus for wireless communication is described. The apparatus may include means for establishing a connection with a UE using a CC, the CC having two or more BWPs each BWP having a portion of a frequency bandwidth of a primary CC, means for transmitting signaling that indicates an SPS configuration or other types of pre-configured resources associated with at least a first BWP of the plurality of BWPs, and means for receiving or transmitting using at least the first BWP according to the SPS configuration or other types of pre-configured resources associated with at least the first BWP.

Another apparatus for wireless communication is described. The apparatus may include a processor, memory in electronic communication with the processor, and instructions stored in the memory. The instructions may be operable to cause the processor to establish a connection with a UE using a CC, the CC having two or more BWPs each BWP having a portion of a frequency bandwidth of a primary CC, transmit signaling that indicates an SPS configuration or other types of pre-configured resources associated with at least a first BWP of the plurality of BWPs, and receive or transmit using at least the first BWP according to the SPS configuration or other types of pre-configured resources associated with at least the first BWP.

A non-transitory computer-readable medium for wireless communication is described. The non-transitory computer-readable medium may include instructions operable to cause a processor to establish a connection with a UE using a CC, the CC having two or more BWPs each BWP having a portion of a frequency bandwidth of a primary CC, transmit signaling that indicates an SPS configuration or other types of pre-configured resources associated with at least a first BWP of the plurality of BWPs, and receive or transmit using at least the first BWP according to the SPS configuration or other types of pre-configured resources associated with at least the first BWP.

Some examples of the method described above may further include processes, features, means, or instructions for identifying a subset of BWPs from the plurality of BWPs that may be to be associated with an SPS configuration. In some examples of the method described above, the signaling may include DCI or RRC messages.

DETAILED DESCRIPTION

Figure 1:
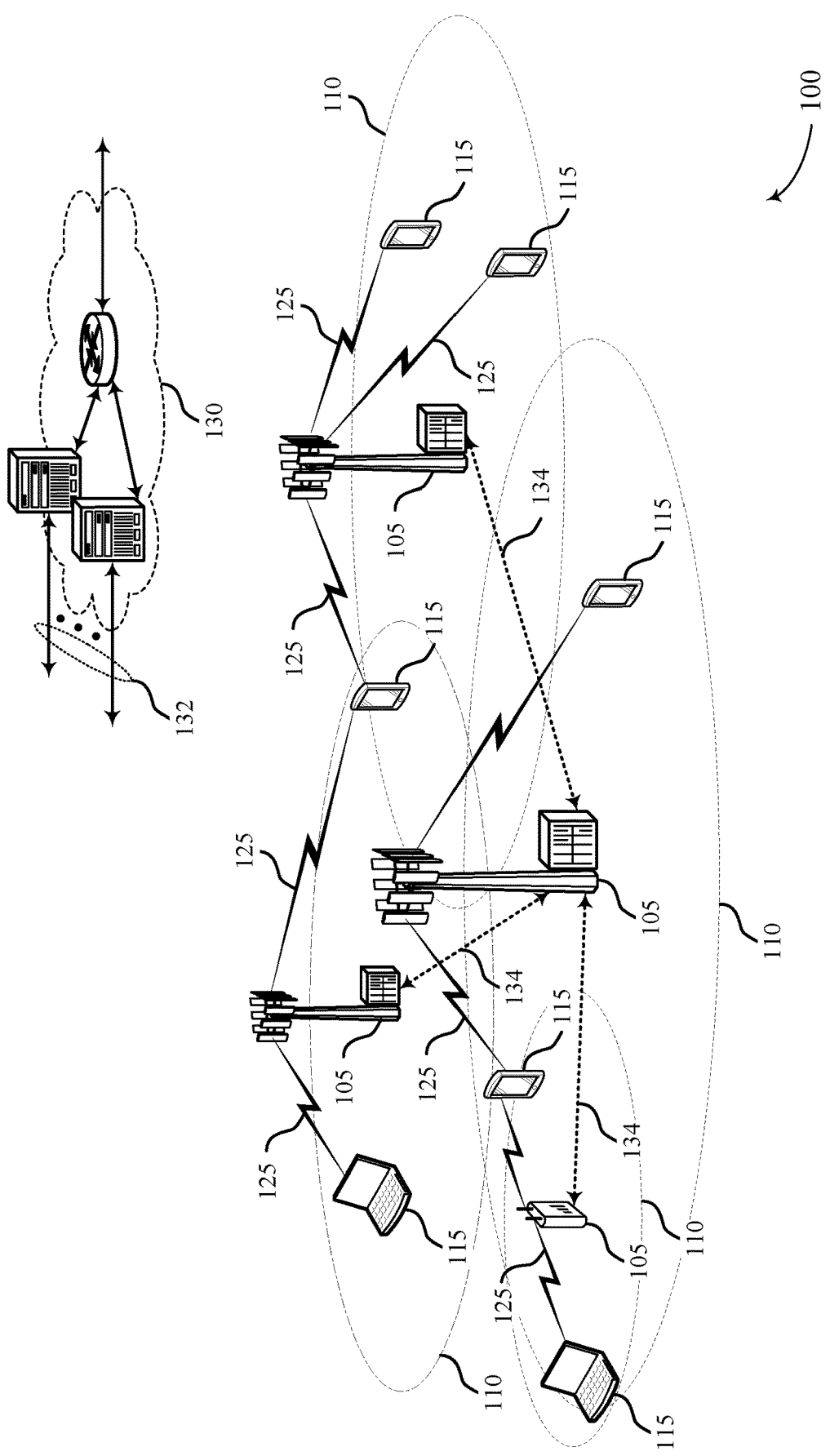
FIG. 1 illustrates an example of a system for wireless communication that supports Semi-Persistent Scheduling (SPS) management in New Radio (NR) in accordance with aspects of the present disclosure.

A wireless communications network may support semi-persistent scheduling (SPS) for uplink and downlink communications. A base station may schedule and allocate resources for a user equipment (UE), such that the UE may transmit and receive messages on the allocated resources. In some examples, the scheduled and allocated resources may be indicated to the UE in a scheduling grant carried in a subframe transmitted from the base station. In some examples, the scheduling grant may be transmitted periodically as part of control information carried via a Physical Downlink Control Channel (PDCCH), e.g., within each subframe of a set of subframes. By providing scheduling grants within each subframe, the base station (including the network) may have greater flexibility in assigning resources to the UE, at the cost of transmitting resource allocation information on PDCCH in every subframe. However, for services such as voice over IP (VoIP), the packet size is usually small, and the inter-arrival time of the packets is constant. To reduce overhead in such operations, instead of allocating resources periodically, the base station may use SPS to allocate resources to the UE at once. The UE may then be configured to use these resources at a set periodicity.

In fourth generation (4G) systems such as a Long Term Evolution (LTE), the SPS may be activated or deactivated by a downlink control information (DCI). In some implementations, the DCI may be transmitted by the base station on the PDCCH. The PDCCH may be included in a physical downlink shared channel (PDSCH). In some cases, the PDCCH may be mapped to a plurality of orthogonal frequency division multiplexing (OFDM) symbols in a downlink subframe. In some cases, the PDCCH may be mapped to a predetermined number of OFDM symbols in every downlink subframe. For example, the predetermined number of OFDM symbols for PDCCH may be 1,2, or 3. In some cases, the base station (such as evolved Node B (eNB)) may inform the UE of the predetermined number of OFDM symbols using a Physical Control Format Indicator Channel (PCFICH). In some implementations, the DCI may be configured to include a transport format, a resource allocation, and information related to hybrid automatic repeat request (HARQ). In some examples, the DCI transmitted on the PDCCH may be protected by a cyclic redundancy check (CRC). In an example of SPS, the CRC may be scrambled by SPS cell Radio Network Temporary Identifier (SPS C-RNTI).

In some implementations where SPS is supported, the UE may receive a PDCCH and may activate an SPS for transmission between the base station and the UE according to a scheduling DCI included in the PDCCH. In some cases, after a first SPS transmission, the subsequent SPS transmission timings may depend on a transmission periodicity and may be performed without a scheduling DCI. More specifically, after activation, the subsequent SPS transmissions in a subframe may be based on a configured SPS periodicity and may be scheduled without a scheduling DCI. In LTE, the UE may be configured to transmit feedback information to the base station using an acknowledgement (ACK)/non-acknowledgement (NACK). The ACK/NACKs may be transmitted according to a HARQ timing. In some cases, the HARQ timing may indicate a timing latency between the PDSCH to a corresponding HARQ response. In some cases, the HARQ timing may be predetermined. For example, in frequency division duplex (FDD), the HARQ timing may follow a 4 ms latency, and in time division duplex (TDD), the HARQ timing may follow a latency greater than 4 ms. In some examples, the HARQ timing in TDD may be based on the TDD downlink (DL)/uplink (UL) subframe configuration.

In fifth generation (5G) or New Radio (NR) systems, a UE may be configured to transmit ACK/NACKs according to a dynamic HARQ timing. For example, in NR systems, the latency between a PDSCH and a HARQ response may be based on a parameter (e.g., k1). In some implementations of NR systems, the HARQ timing may be dynamically indicated to a UE in a scheduling DCI. For example, the HARQ timing may be indicated using a 2-bit field in the DCI. In some cases, the 2-bit field in the DCI may be configured to indicate 4 different values. For example, the DCI may indicate that a HARQ response may be transmitted in the same slot, a HARQ response in a following slot, a HARQ response may be transmitted in a next available UL slot, or a combination thereof. In some examples, the HARQ timing may be dynamically configured by a base station (giga Node B (gNB)). In some cases, the gNB may choose a HARQ timing based on operation conditions of a UE, capabilities associated with the UE. For example, if a UE is capable of high performance, then the gNB may configure the UE to a reduced HARQ timing. As previously discussed, the gNB may dynamically indicate the HARQ timing using a DCI. However, in NR systems supporting SPS, there exists a need to efficiently determine HARQ timing for transmissions without a scheduling DCI.

To address the problem of efficiently determining dynamic HARQ timing in NR systems, in some cases, a HARQ timing for SPS transmissions without a scheduling DCI may be predetermined. In some implementations, the UE may receive an indication to initiate transmissions according to a received SPS configuration. Upon receiving the SPS configuration, the UE may be configured to assume a predetermined HARQ timing. For example, the UE may be configured to assume a single latency value for transmitting ACK/NACKs in response to a downlink transmission. In such cases, the UE may receive an initial HARQ timing in the initial DCI (or the DCI associated with SPS configuration). The UE may use the HARQ timing indication in the initial DCI for transmitting ACK/NACK associated with the initial DCI. For example, the UE may transmit feedback to the base station indicating whether the initial DCI was successfully decoded after a timing latency indicated by the HARQ timing in the DCI. In some cases, for subsequent SPS transmissions without a scheduling DCI, the UE may be configured to use a predetermined HARQ timing value. In some examples, the predetermined HARQ timing value may be dependent on a UE capability. For example, the capability of a UE may be a capability of the UE to decode a received downlink transmission (received via PDSCH). In some implementations, the UE may be configured to indicate the predetermined HARQ timing to the base station, and the base station may adopt the received HARQ timing. As one example, the UE may assume the HARQ timing value as 4 (e.g., k1=4). In this example, the UE may transmit feedback (such as ACK/NACK) associated with a PDSCH in a slot, which is transmitted 4 slots after receiving the PDSCH.

In another example, a HARQ timing for SPS transmissions without a scheduling DCI may be configured by radio resource control (RRC) signaling. In some implementations, the UE may receive an indication to initiate transmissions according to a received SPS configuration via RRC. In some implementations, the UE may receive the HARQ timing in the RRC signaling. In some examples, upon receiving the RRC signaling, the UE may be configured to set up the HARQ timing based on the RRC signaling and a capability associated with the UE. In some cases, the UE capability may be static. In some cases, the UE may be configured to semi-statically determine a HARQ response timing latency (or HARQ timing). In some cases, the UE may maintain a capability profile. For example, the capability profile may indicate a minimum number of HARQ timing value (such as k1 value) supported by the UE. In some examples, the gNB may determine the HARQ timing based on the capability profile of the UE. In some examples, the capability profile of the UE may be semi-statically configured when a dynamic signaling option is not used by the UE. In some cases, the dynamic signaling option may be indicated using 2 bits in the DCI. Additionally, or alternatively, the UE may be configured to determine the capability profile based on an initial signaling procedure with the base station. In some cases, if there are two or more SPS instances, the SPS configuration and HARQ timing may be separate for each SPS instance.

Additionally, or alternatively, a HARQ timing for SPS transmissions without a scheduling DCI may be configured by the most recent DCI activating the SPS. For example, the UE may receive a DCI from a base station indicating activation of SPS configuration for transmission between the base station and the UE. In some cases, the UE may receive an initial HARQ timing in the DCI. The UE may be configured to use the received HARQ timing for subsequent transmissions without a scheduling DCI. In some examples, the base station (such as a gNB) may be configured to transmit another activation DCI to update a HARQ timing value. In some examples, the activation DCI may indicate a HARQ timing, not only for a PDSCH transmission associated with the activation, but also for all subsequent PDSCH transmissions without a scheduling DCI. In some implementations, the HARQ timing for a PDSCH transmission without a scheduling DCI may additionally or alternatively be a function of one or more other parameters. For example, the HARQ timing may be a function of at least one of: a slot structure, a bandwidth part (BWP) switching procedure, or a combination thereof. In some examples, the slot structure may include an UL transmission opportunity for transmitting an ACK/NACK in response to a DL transmission slot structure. In some cases, the slot structure may be dynamically indicated by at least one slot-format-indicator (SFI). For example, if the slot-structure indicates that the slot is designated for is indicated as DL transmissions, then the HARQ response may be skipped or postponed to the next opportunity.

In some wireless communications systems in NR, a UE may establish a connection with a base station using a component carrier (CC). The CC may include multiple BWPs, each BWP having a portion of frequency bandwidth of the CC. In some examples, a UE may be configured with two or more BWPs. In some implementations, BWP may be a way to limit an operating bandwidth of a UE at a given time. For cases of low-bandwidth operations, it may be beneficial to conserve bandwidth. For example, a CC may be 100 MHz and a UE may operate within 20 MHz. In such an example, to conserve bandwidth and to save power, the UE can be configured to operate on a BWP on the CC. In some examples, a first BWP may be configured to include a first frequency range and a second BWP may be configured to include a second frequency range. In some cases, the first frequency range is not overlapping or partially overlapping with the second frequency range. In some cases, the UE may be dynamically switched from one BWP to another BWP. Such switching from one BWP to another BWP may be performed using a DCI. In the current NR systems, at one time, one BWP is active for a serving base station of the UE. In NR systems with a configured SPS, when two or more BWPs are configured for a serving cell (base station or gNB), and when the UE dynamic switches among the BWPs, there is no efficient way to manage the SPS configuration with switching the BWPs.

To efficiently manage SPS configuration when an active BWP is switched from one BWP that includes SPS resources to one that does not include SPS resources, the UE and the base station may use BWP dependent SPS configurations and/or activations. In one example, the SPS periodicity and offsets may be configured separately for each BWP. In some cases, the UE may be configured to receive signaling that indicates an SPS configuration or other types of pre-configured resources associated with a first BWP. The UE may then transmit or receive using the first BWP according to the received SPS configuration or other types or pre-configured resources.

To avoid interruption of availability of SPS, the base station may configure a set of BWPs or other resources in which an SPS configuration may be supported. In some cases, the base station may configure all BWPs to support SPS configuration. In some cases, resources for SPS configuration on the BWPs may be pre-configured. This is because when a UE switches from a first BWP to a second BWP, then the UE may still be configured to use the SPS resources associated with the second BWP without interruption. In some examples, SPS resources may be included within one BWP, but may not be included within another BWP. In such cases, if an active BWP is not pre-configured to support SPS, the UE may consider that the SPS is implicitly released.

In some examples, for an active BWP, the UE may be configured to determine corresponding SPS slots based on the respective SPS configurations. In some examples, upon activating a BWP, the UE may receive a DCI activating SPS. The UE may use information from the DCI to activate PDSCH resources for one or more additional BWPs.

Aspects of the disclosure are initially described in the context of a wireless communications system. Aspects of the disclosure are further illustrated by and described with reference to apparatus diagrams, system diagrams, and flowcharts that relate to SPS management in NR.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be an LTE network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, the UE 115 may receive signaling from base station 105 to activate an SPS configuration for transmissions between the UE 115 and the base station 105. The UE 115 may then receive a HARQ timing for downlink transmissions based on the SPS configuration being activated. In some cases, the UE 115 may be configured to determine a HARQ timing value based on the capabilities associated with the UE 115. In some cases, the HARQ timing value may be predetermined.

In some examples, the UE 115 may establish a connection with the base station 105 using a CC. In some cases, the CC may have a plurality of BWPs, each BWP having a portion of a frequency bandwidth of the CC. The UE 115 may receive signaling that indicates an SPS configuration or other types of pre-configured resources associated with at least a first BWP of the plurality of BWPs. Upon receiving the SPS configuration, the UE may transmit or receive using at least the first BWP according to the SPS configuration or other types of pre-configured resources associated with at least the first BWP.

In some examples, the base station 105 may establish a connection with the UE 115 using a CC. The base station 105 may transmit signaling that indicates an SPS configuration or other types of pre-configured resources associated with at least a first BWP. The base station 105 may then receive or transmit using at least the first BWP according to the SPS configuration or other types of pre-configured resources associated with at least the first BWP.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA)

or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
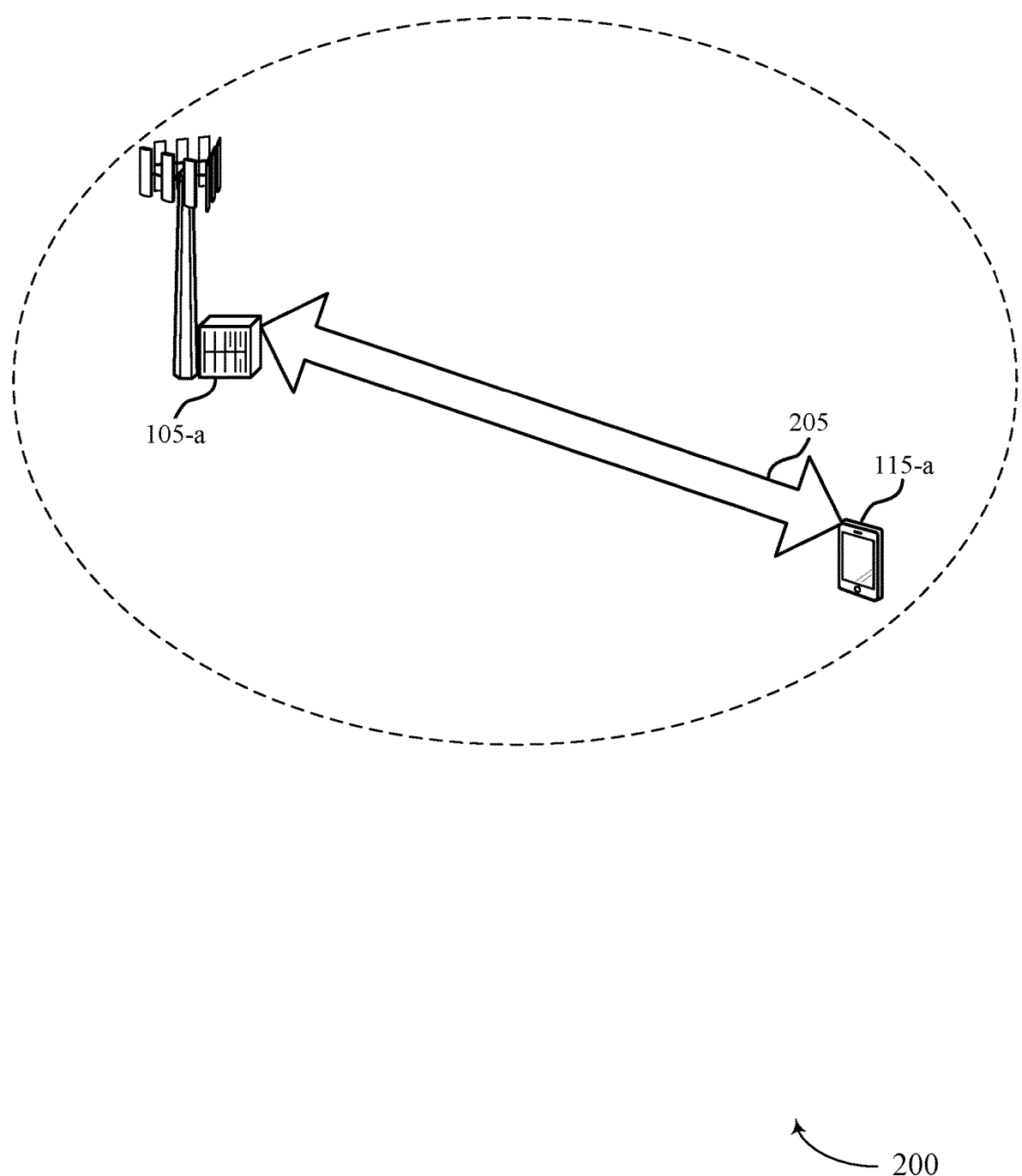
FIG. 2 illustrates an example of a wireless communication system that supports SPS management in NR in accordance with aspects of the present disclosure.

FIG. 2 illustrates an example of a wireless communication system 200 that supports SPS management in NR in accordance with aspects of the present disclosure. In some examples, wireless communication system 200 may implement aspects of wireless communication system 100.

In the example of FIG. 2, wireless devices (e.g., UE 115-a) may support communications over carrier 205. The wireless communication system 200 may be a 5 G or NR system that supports SPS for uplink and downlink communications. The base station 105-a may schedule UE 115-a to transmit uplink messages on reserved resources. According to various techniques described previously, the UE 115-a may receive resource allocation information on PDCCH. More specifically, the UE 115-a may receive the PDCCH included a PDSCH. In some implementations, the UE 115-a may receive an indication to activate an SPS configuration. In some cases, the indication to activate the SPS may be received via a DCI. In some cases, the DCI may be transmitted by the base station 105-a; over carrier 205. Upon receiving a signal to activate an SPS configuration, the UE 115-a may activate the SPS configuration for transmission between the base station 105-a and the UE 115-a. In some examples, the SPS configuration may be activated according to a scheduling DCI included in the PDCCH. In some implementations, upon receiving the SPS configuration (via a DCI in the PDCCH), the UE 115-a may be configured to determine a HARQ timing. In some cases, the HARQ timing may be predetermined. In some implementations, the UE 115-a may be configured to assume a latency value (or HARQ timing) for transmitting ACK/NACKs in response to a downlink transmission.

In some implementations, the UE 115-a may receive an initial DCI from the base station 105-a instructing an activation of SPS configuration. As discussed previously, the initial DCI may be a part of the PDCCH. In some cases, the initial DCI may include an initial HARQ timing. The UE 115-a may thus receive a DCI and may identify the HARQ timing indicated by the DCI. In some cases, the UE 115-a may use the determined HARQ timing for transmitting ACK/NACKs associated with the initial DCI. As an example, the UE 115-a may transmit a feedback (in form of ACK or NACK) to the base station 105-a indicating whether the initial DCI was successfully decoded. This feedback may be transmitted after a timing latency indicated by the HARQ timing in the initial DCI.

In some cases, after activating the SPS configuration, the UE 115-a may be configured to transmit uplink messages to the base station 105-a according to a periodicity set by the SPS configuration. In such cases, the UE 115-a may not receive a scheduling DCI for every subsequent transmission. In some examples, for subsequent transmissions without a scheduling DCI, the UE 115-a may use a predetermined HARQ timing value. In some examples, the predetermined HARQ timing value may be dependent on a UE capability. As previously discussed, the UE capability may be based on a capability profile.

According to a second example, a HARQ timing value for transmitting feedback associated with SPS transmissions may be configured by RRC signaling. For example, the UE 115-a may receive an RRC signal from the base station 105-a. The RRC signal may indicate an initiating of transmissions according to a received SPS configuration. In some implementations, the UE 115-a may receive the HARQ timing in the RRC signaling. Upon receiving the HARQ timing value, the UE 115-a may use a timing latency indicated by the HARQ timing value to provide feedback to the base station 105-a. In some examples, upon receiving the RRC signaling, the UE 115-a may be configured to set up the HARQ timing based on the RRC signaling and a capability associated with the UE 115-a. In some cases, the capability may be based on a minimum value of the HARQ timing supported by the UE 115-a. In some cases, the capability of the UE 115-a may be static.

In a further example, a HARQ timing for SPS transmissions without a scheduling DCI may be configured by the most recent DCI activating the SPS. For example, as previously discussed, the UE 115-a may receive a DCI from the base station 105-a. indicating activation of SPS configuration for transmission between the base station and the UE. In some examples, the UE 115-a may receive an initial HARQ timing in the DCI activating the SPS configuration. The UE 115-a may then be configured to use the received HARQ timing for subsequent transmissions without a scheduling DCI. In some examples, the UE 115-a may continue to use the HARQ timing value until the HARQ timing value is updated by the base station 105-a. For example, the HARQ timing value may be updated by the base station 105-a by a second activation DCI.

Figure 3:
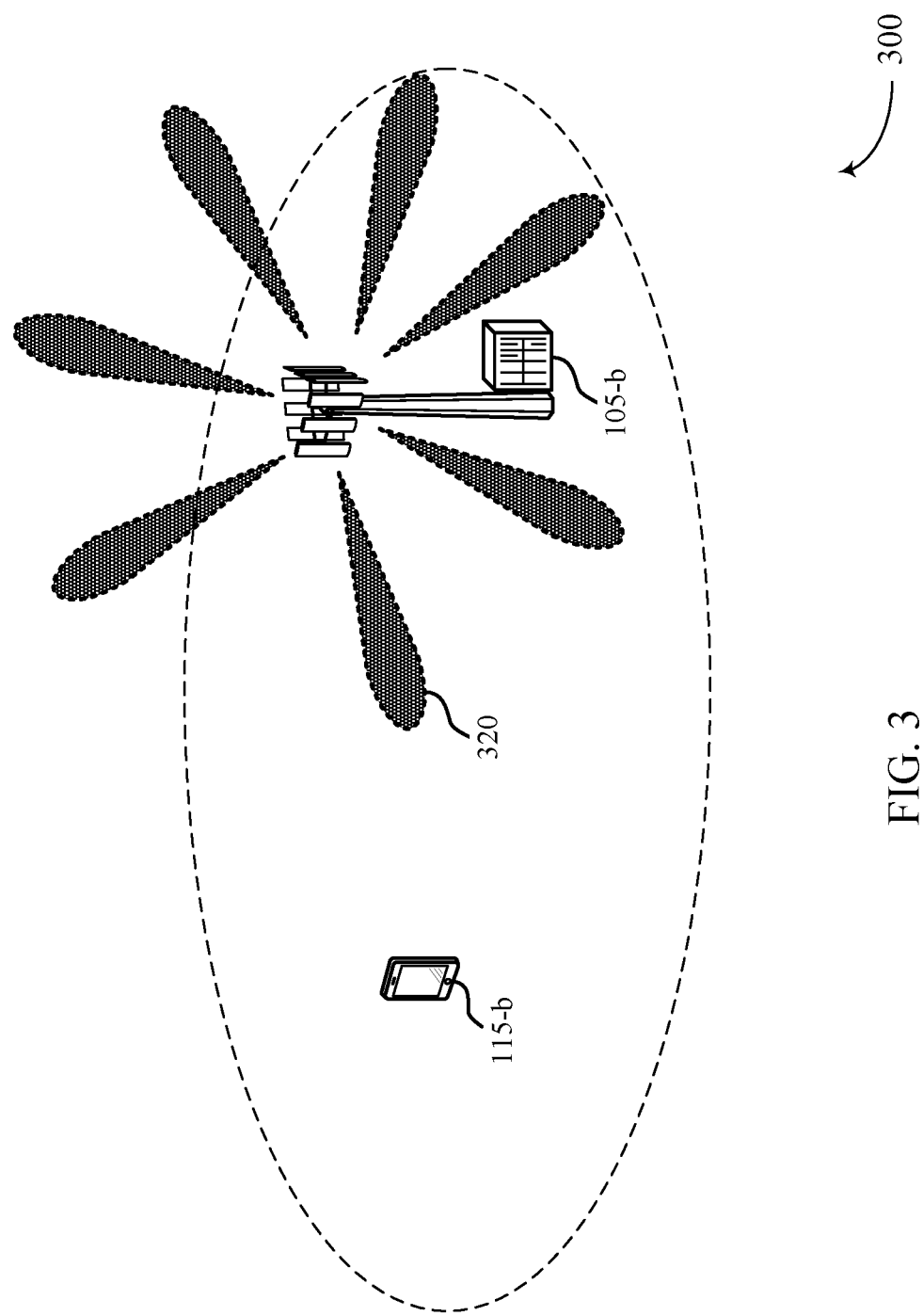
FIG. 3 illustrates an example of a wireless communication system that supports SPS management in NR in accordance with aspects of the present disclosure.

FIG. 3 illustrates an example of a wireless communication system 300 that supports SPS management in NR in accordance with aspects of the present disclosure. In some examples, the wireless communication system 300 may implement aspects of wireless communication system 100 and wireless communication system 200, as described with reference to FIGS. 1 and 2.

In the example of FIG. 3, the base station 105-*b* and the UE 115-*b* may establish a connection (not shown). In some cases, the connection may have one or more wideband CCs. As indicated above, in some cases one or more of the CCs may include one or more BWPs. For example, a CC may include two or more BWPs. In some cases, the base station 105-*a* may configure the connection 305 with two or more BWPs, and may activate and deactivate one or more of the BWPs through DCI signaling. In some cases, the UE 115-*b* may receive a signal to activate a first BWP and a second BWP may be inactive by default. In some implementations, the base station 105-*b* may activate the second BWP through transmitting DCI to the UE 115-*a* that indicates the second BWP is to be activated. The UE 115-*b* may receive the DCI and, in some cases, acknowledge receipt of the DCI. In some cases, the UE 115-*b* may acknowledge the receipt of the DCI after a timing latency indicated by HARQ timing.

As discussed above, in some cases one or more BWPs may be activated by the base station 105-*b* via a scheduling DCI, that is transmitted to the UE 115-*b*. In such cases, multiple BWPs may be configured, and the DCI may include an indication of which BWPs are active for a particular transmission or for a predetermined time period. The UE 115-*b*, upon receiving the DCI, may activate the BWP indicated as active, and deactivate any previously active BWPs that are no longer indicated as being active. In some examples, the base station 105-*b* may transmit a BWP DCI on an active beam to UE 115-*b* via beamformed transmission 320.

In some examples, the UE 115 may receive an indication of SPS resources associated with an active BWP. For example, the base station 105-*b* may be configured to determine SPS configurations and several BWPs to be associated with the SPS configuration. For example, the base station 105-*b* may configure a set of BWPs or other resources in which an SPS configuration may be supported. In some examples, the base station 105-*b* may configure all BWPs to support SPS configuration. In some examples, the base station 105-*b* may configure a subset of the BWPs to support SPS configuration. In some cases, the base station 105-*b* may pre-configure resources for SPS configuration on the BWPs. In some examples, SPS resources may be included within one BWP, but may not be included within another BWP. In such cases, if an active BWP is not pre-configured to support SPS, the UE 115-*b* may consider that the SPS is implicitly released.

In some examples, the base station 105-*b* may transmit to the UE 115-*b*, an indication to switch BWPs. In some cases, if an active BWP is switched from a first BWP to a second BWP, then the UE 115-*b* may transmit or receive using SPS configurations associated with the second BWP. For example, the base station 105-*b* may indicate information associated with SPS configurations in the signal indicating switching of the BWPs. In one example, the SPS periodicity and offsets may be configured separately for each BWP.

Figure 4:
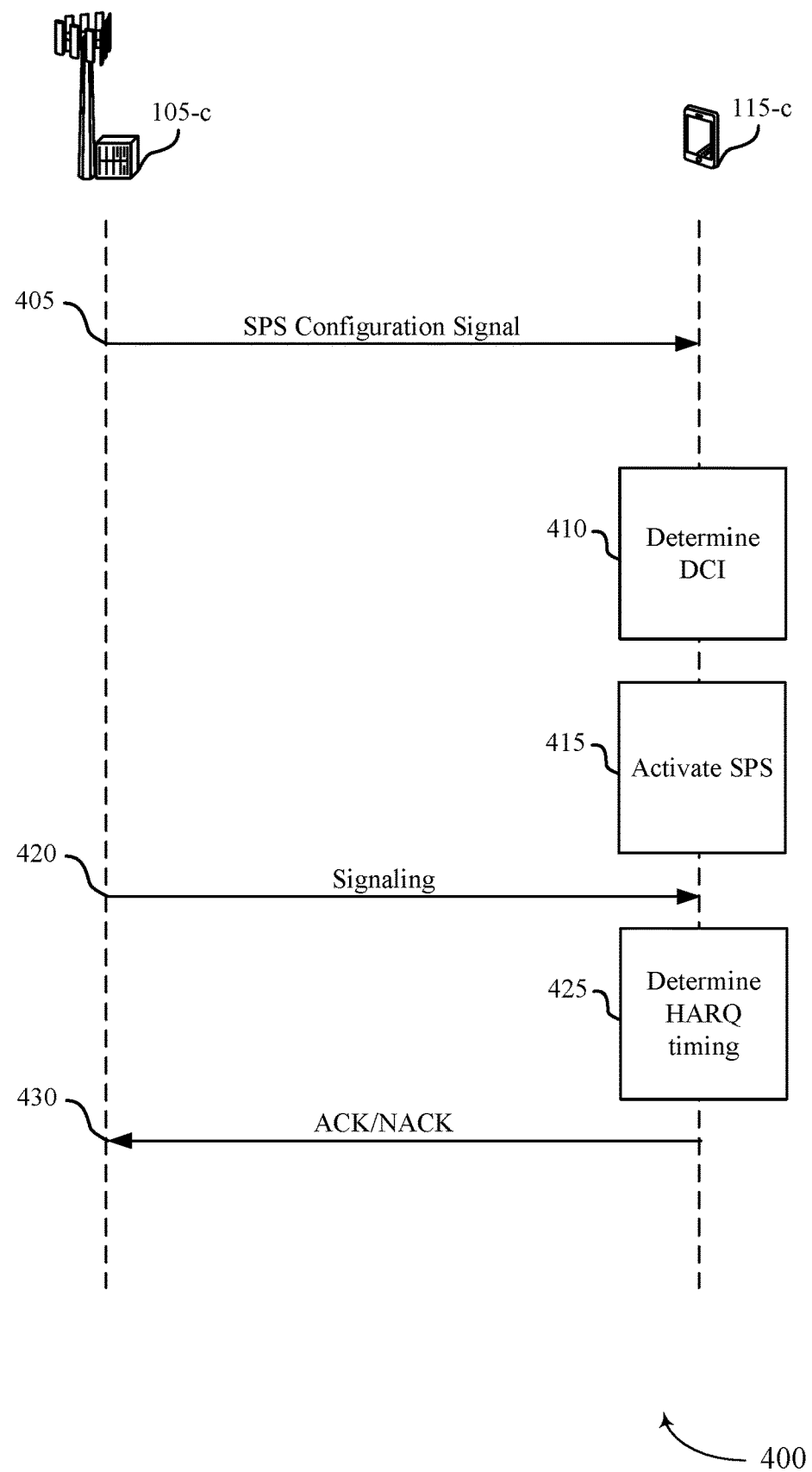
FIG. 4 illustrates an example of a process flow that supports SPS management in NR in accordance with aspects of the present disclosure.

FIG. 4 illustrates an example of a process flow 400 that supports SPS management in NR in accordance with aspects of the present disclosure. In some examples, process flow 400 may implement aspects of wireless communication system 100. Base station 105-*c* may be an example of base station 105, as described with reference to FIG. 1. UE 115-*c* may be an example of UE 115, as described with reference to FIG. 1.

In the following description of the process flow 400, the operations between the base station 105-*c* and UE 115-*c* may be transmitted in a different order than the exemplary order shown, or the operations performed by the base station 105-*c* and UE 115-*c* may be performed in different orders or at different times. Some operations may also be left out of the process flow 400, or other operations may be added to the process flow 400.

At 405, base station 105-*c* may transmit a signal to activate an SPS configuration for transmission between the base station 105-*c* and the UE 115-*c* as described with reference to FIGS. 1 and 2. In some examples, the signal may be a PDCCH signal including a DCI indicating information associated with the SPS configuration. In some cases, the DCI may indicate initiation of an SPS configuration, periodicity of upcoming SPS transmissions, etc.

At 410, the UE 115-*c* may determine the DCI included in the signal. In some examples, the UE 115-*c* may receive an initial HARQ timing as part of the signaling. In some cases, the HARQ timing may be for transmitting feedback associated with the DCI. In some cases, the HARQ timing may be used by the UE 115-*c* to transmit feedback in response to subsequent downlink transmissions without a scheduling DCI. AT 415, upon receiving the SPS configuration signal and determining the DCI, the UE 115-*c* may activate SPS configuration for transmissions between the base station 105-*c* and the UE 115-*c*.

At 420, the UE 115-*c* may receive downlink transmissions from the base station 105-*c*. At 425, the UE 115-*c* may determine a HARQ timing to provide feedback associated with the downlink transmission. In one example, the HARQ timing value may be predetermined. For example, the UE 115-*c* may predetermine the HARQ timing value based on a UE capability. In another example, the HARQ timing value may be indicated by RRC signaling (not shown) In a further example, the HARQ timing value may be the value indicated in the DCI received by the UE 115-*c* at 405. In such cases, the UE 115-*c* may continue to use the HARQ timing value associated with the DCI until the DCI is updated.

At 425, the UE 115-*c* may transmit an ACK/NACK in response to the downlink transmission according to a timing latency indicated by the received HARQ timing.

Figure 5:
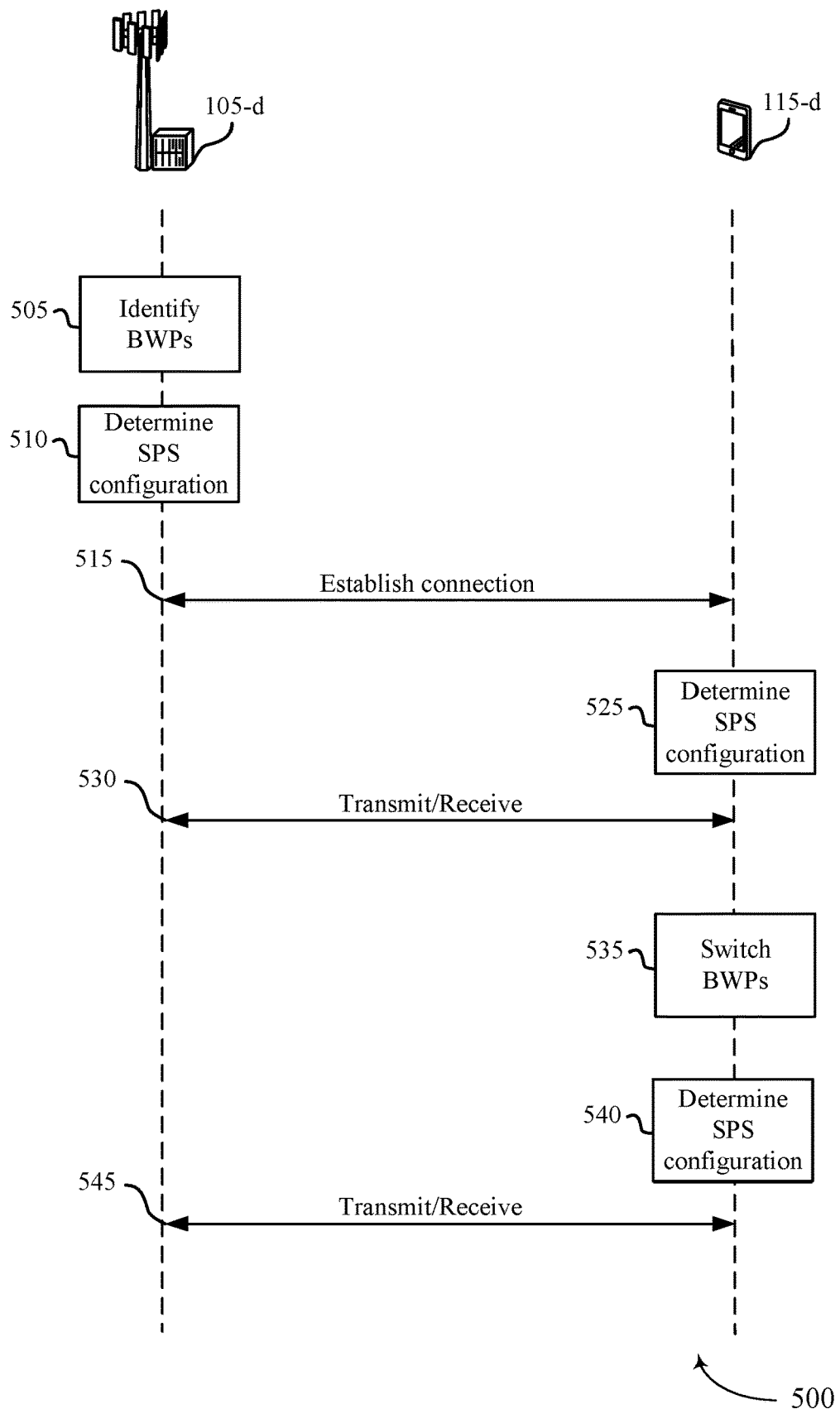
FIG. 5 illustrates an example of a process flow that supports SPS management in NR in accordance with aspects of the present disclosure.

FIG. 5 illustrates an example of a process flow 500 that supports SPS management in NR in accordance with aspects of the present disclosure. In some examples, process flow 500 may implement aspects of wireless communication system 100. Base station 105-*d* may be an example of base station 105, as described with reference to FIG. 1. UE 115-*d* may be an example of UE 115, as described with reference to FIG. 1.

In the following description of the process flow 500, the operations between the base station 105-*d* and UE 115-*d* may be transmitted in a different order than the exemplary order shown, or the operations performed by the base station 105-*d* and UE 115-*d* may be performed in different orders or at different times. Some operations may also be left out of the process flow 500, or other operations may be added to the process flow 500.

At 505, the base station 105-*d* may identify a plurality of BWPs. In some examples, each BWP may include a portion of a frequency bandwidth of a primary CC. In some cases, a first BWP may include a first range of frequencies and a second BWP may include a second range of frequencies, where the first range of frequencies do not overlap with the second range of frequencies. At 510, the base station 105-*d* may identify a subset of BWPs from the plurality of BWPs and associate the subset of BWPs with an SPS configuration.

At 515, the base station 105-*d* and the UE 115-*d* may establish a connection with each other using a CC. In some cases, the CC having a plurality of BWPs. In some cases, the UE 115-*d* may receive a signaling that indicates the SPS configuration or other types of pre-configured resources associated with a BWP. In some examples, the signaling may include DCI and RRC messages.

At 525, upon establishing the connection, the UE 115-*d* may activate a BWP and may determine the SPS configurations associated with the activated BWP. In some cases, the UE 115-*d* may determine other types of pre-configured resources associated with the activated BWP. At 530, the UE 115-*d* and the base station 105-*d* may transmit or receive using the activated BWP according to the SPS configuration or other types of pre-configured resources associated with the activated BWP.

At 535, the UE 115-*d* may switch from a first BWP to a second BWP. In some cases, the switching may be in response to a signaling that indicates a SPS configuration or other types of pre-configured resources associated with the second BWP (not shown). At 540, the UE 115-*d* may determine SPS configuration information associated with the second BWP. In some cases, the UE 115-*d* may determine other types of pre-configured resources associated with the second BWP. At 545, the UE 115-*d* may transmit or receive using the second BWP according to the determined SPS configuration or other types of pre-configured resources associated with the second BWP.

Figure 6:
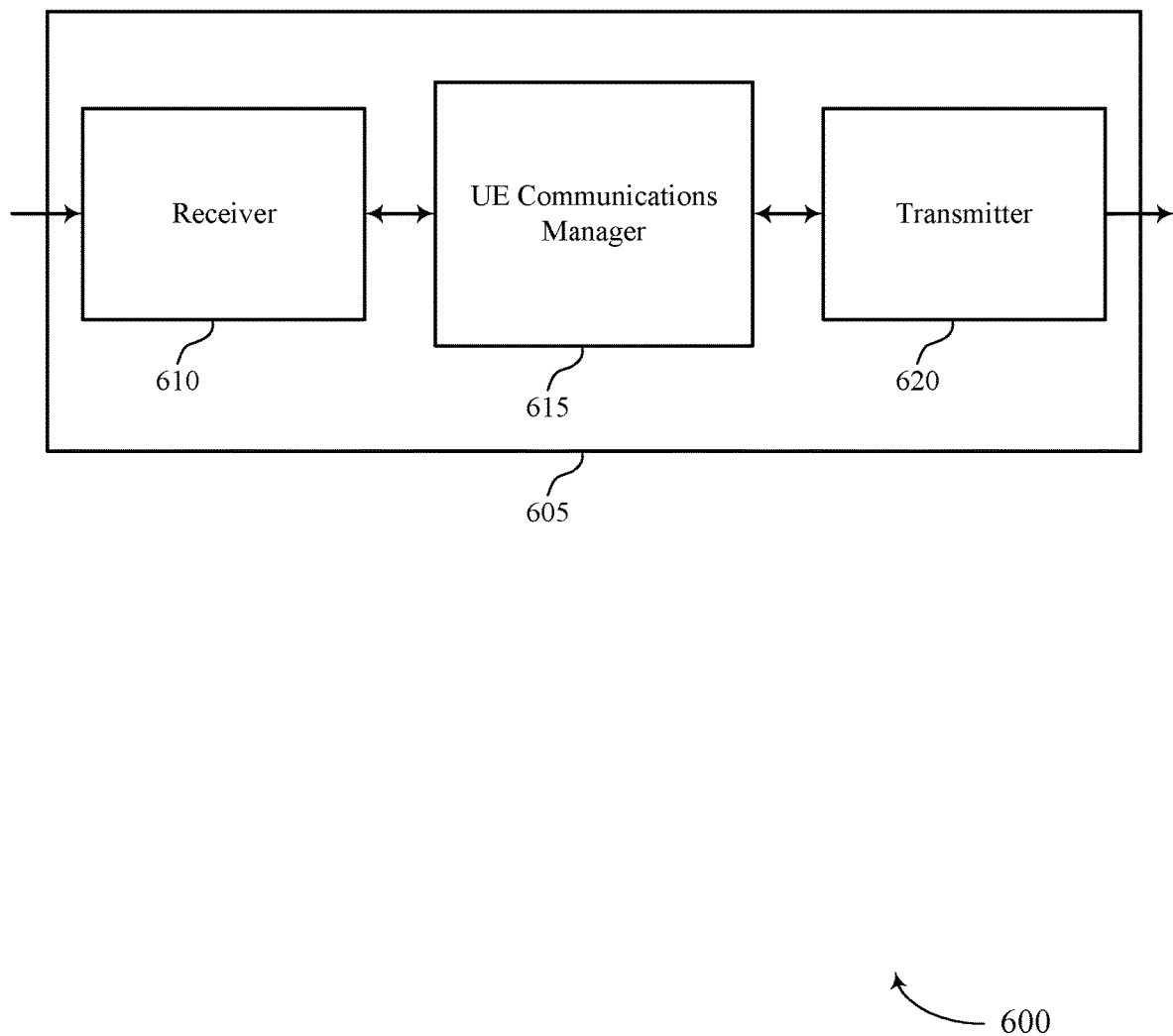
FIGS. 6 through 8 show block diagrams of a device that supports SPS management in NR in accordance with aspects of the present disclosure.

FIG. 6 shows a block diagram 600 of a wireless device 605 that supports SPS management in NR in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to SPS management in NR, etc.). Information may be passed on to other components of the device. The receiver 610 may be an example of aspects of the transceiver 935 described with reference to FIG. 9. The receiver 610 may utilize a single antenna or a set of antennas. Receiver 610 may receive a downlink transmission without a scheduling DCI.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive signaling from a base station to activate an SPS configuration for transmission between the base station and the UE, and receive a HARQ timing for downlink transmissions based on the SPS configuration being activated. The UE communications manager 615 may also receive signaling from a base station to activate an SPS configuration for transmission between the base station and the UE and determine a HARQ timing for downlink transmissions based on a capability associated with the UE. The UE communications manager 615 may also establish a connection with a base station using a CC, the CC having a set of BWPs, each BWP having a portion of a frequency bandwidth of the CC. In some cases, the UE communications manager 615 may receive signaling that indicates an SPS configuration or other types of pre-configured resources associated with at least a first BWP of the set of BWPs, and transmit or receive using at least the first BWP according to the SPS configuration or other types of pre-configured resources associated with at least the first BWP.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas. Transmitter 620 may transmit an ACK/NACK in response to the downlink transmission according to a timing latency indicated by the received HARQ timing.

Figure 7:
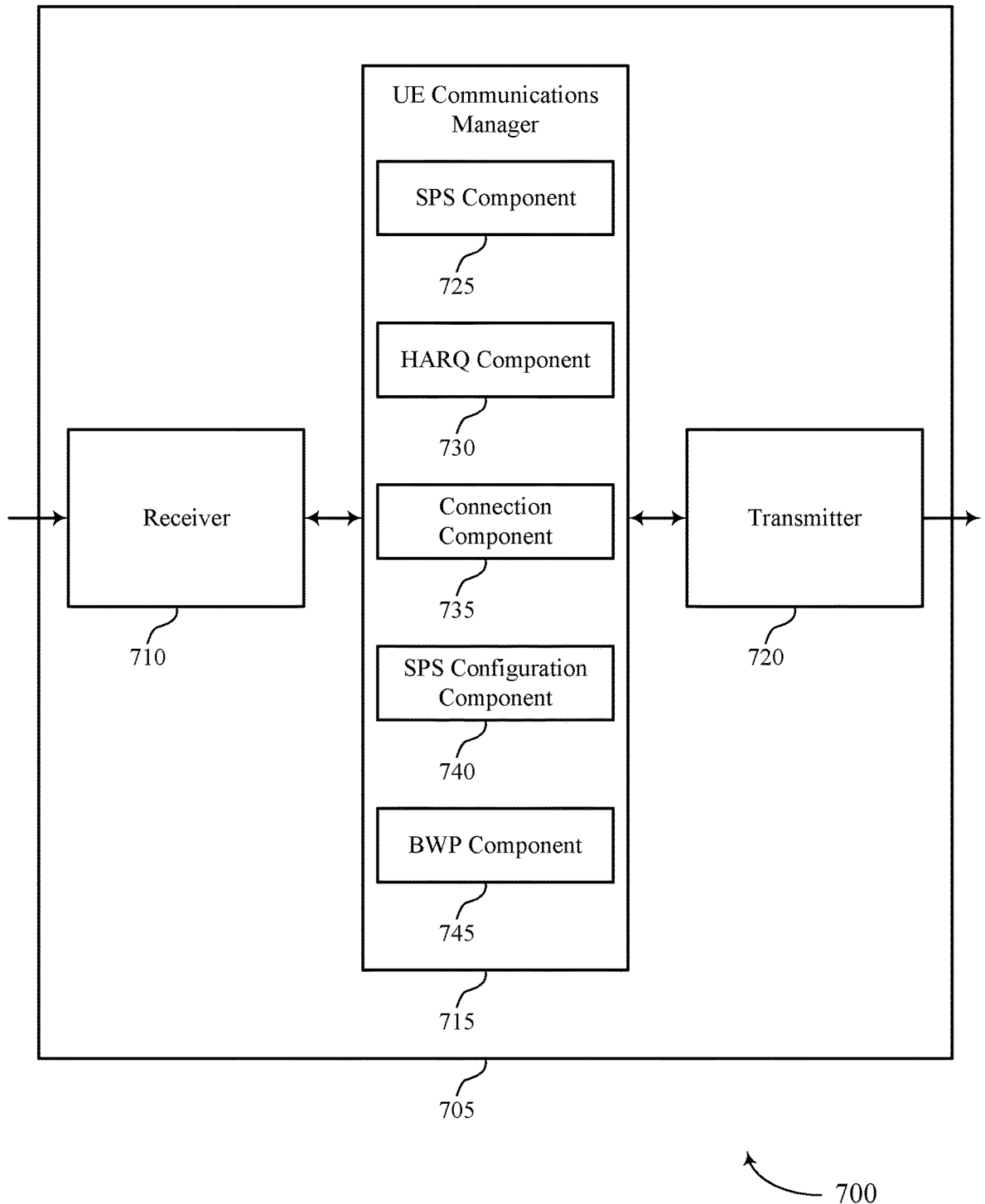

FIG. 7 shows a block diagram 700 of a wireless device 705 that supports SPS management in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to SPS management in NR, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include SPS component 725, HARQ component 730, connection component 735, SPS configuration component 740, and BWP component 745.

SPS component 725 may receive signaling from a base station to activate an SPS configuration for transmission between the base station and the UE and receive signaling from the base station to activate a second SPS configuration for a second set of transmissions between the base station and the UE.

HARQ component 730 may receive a HARQ timing for downlink transmissions based on the SPS configuration being activated, receive a second HARQ timing via RRC signaling. In some cases, the second HARQ timing may be associated with the second SPS configuration. The HARQ component may also receive the HARQ timing via the activation DCI, the activation DCI including a PDSCH, and determine a HARQ timing for downlink transmissions based on a capability associated with the UE (such as UE 115). In some cases, the received HARQ timing is applied to the PDSCH with the activation DCI and subsequent transmissions of PDSCH without a DCI. In some cases, the HARQ timing is a function of at least one of a slot structure, or a BWP switching procedure, or a combination thereof. In some cases, the HARQ timing is a function of at least one of a slot structure and a BWP switching procedure.

Connection component 735 may establish a connection with a base station using a CC, the CC having a set of BWPs, each BWP having a portion of a frequency bandwidth of the CC.

SPS configuration component 740 may receive signaling that indicates an SPS configuration or other types of pre-configured resources associated with at least a first BWP of the set of BWPs. The SPS configuration component 740 may receive signaling that indicates a SPS configuration or other types of pre-configured resources associated with at least a second BWP of the set of BWPs. The SPS configuration component 740 may determine the second BWP is unassociated with an SPS configuration or other types of pre-configured resources. In some cases, the signaling includes DCI or RRC messages.

BWP component 745 may transmit or receive using at least the first BWP according to the SPS configuration or other types of pre-configured resources associated with at least the first BWP. In some cases, the BWP component 745 may transmit or receive using at least the second BWP according to the SPS configuration or other types of pre-configured resources associated with at least the second BWP. In some cases, the BWP component may transmit or receive using the second BWP and without an active SPS configuration.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
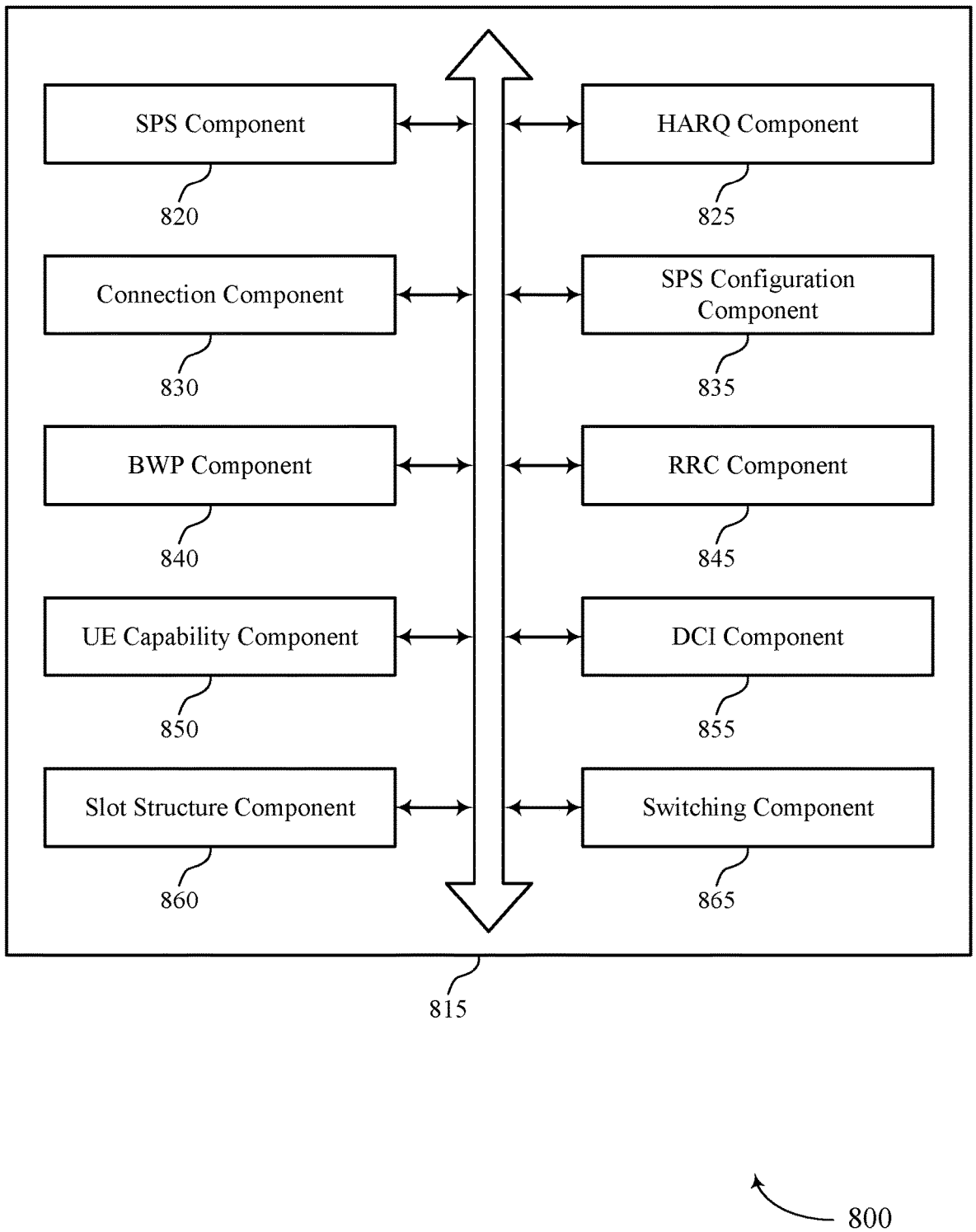

FIG. 8 shows a block diagram 800 of a UE communications manager 815 that supports SPS management in NR in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include SPS component 820, HARQ component 825, connection component 830, SPS configuration component 835, BWP component 840, RRC component 845, UE capability component 850, DCI component 855, slot structure component 860, and switching component 865. Each of these modules may communicate, directly or indirectly, with one another (e.g., via one or more buses).

SPS component 820 may receive signaling from a base station to activate an SPS configuration for transmission between the base station and the UE, and may receive signaling from the base station to activate a second SPS configuration for a second set of transmissions between the base station and the UE.

HARQ component 825 may receive a HARQ timing for downlink transmissions based on the SPS configuration being activated. In some cases, the HARQ component 825 may receive a second HARQ timing via the RRC signaling, the second HARQ timing being associated with the second SPS configuration. In some implementations, the HARQ component 825 may receive the HARQ timing via the activation DCI, the activation DCI including a PDSCH, and determine a HARQ timing for downlink transmissions based on a capability associated with the UE. In some cases, the received HARQ timing is applied to the PDSCH with the activation DCI and subsequent transmissions of PDSCH without a DCI. In some cases, the HARQ timing is a function of at least one of: a slot structure, a BWP switching procedure, or a combination thereof.

Connection component 830 may establish a connection with a base station using a CC, the CC having a set of BWPs, each BWP having a portion of a frequency bandwidth of the CC.

SPS configuration component 835 may receive signaling that indicates an SPS configuration or other types of pre-configured resources associated with at least a first BWP of the set of BWPs, receive signaling that indicates a SPS configuration or other types of pre-configured resources associated with at least a second BWP of the set of BWPs, and determine the second BWP is unassociated with an SPS configuration or other types of pre-configured resources. In some cases, the signaling includes DCI or RRC messages.

BWP component 840 may transmit or receive using at least the first BWP according to the SPS configuration or other types of pre-configured resources associated with at least the first BWP. In some cases, the BWP component 840 may transmit or receive using at least the second BWP according to the SPS configuration or other types of pre-configured resources associated with at least the second BWP. In some cases, the BWP component 840 may transmit or receive using the second BWP and without an active SPS configuration.

RRC component 845 may receive an RRC signaling from the base station. In some cases, receiving the HARQ timing may include receiving the HARQ timing via the RRC signaling from the base station.

UE capability component 850 may determine a capability of the UE (such as UE 115). In some cases, the HARQ timing is based on the capability of the UE. In some cases, the capability associated with the UE is based on a capability profile for the UE, where the capability profile indicates a minimum value of the HARQ timing supported by the UE. In some cases, the capability associated with the UE is static.

DCI component 855 may receive a second activation DCI that includes second HARQ timing, the second HARQ timing replacing the previously received HARQ timing. In some cases, the signaling to activate the SPS configuration includes an activation DCI. In some cases, the received signaling to activate the SPS configuration includes an activation DCI.

Slot structure component 860 may determine a slot structure. In some cases, the slot structure includes an uplink transmission opportunity for transmitting an ACK/NACK in response to a downlink transmission. In some cases, the slot structure is dynamically indicated by at least one SFI. Switching component 865 may switch from the first BWP to the second BWP and switch from the first BWP to a second BWP.

Figure 9:
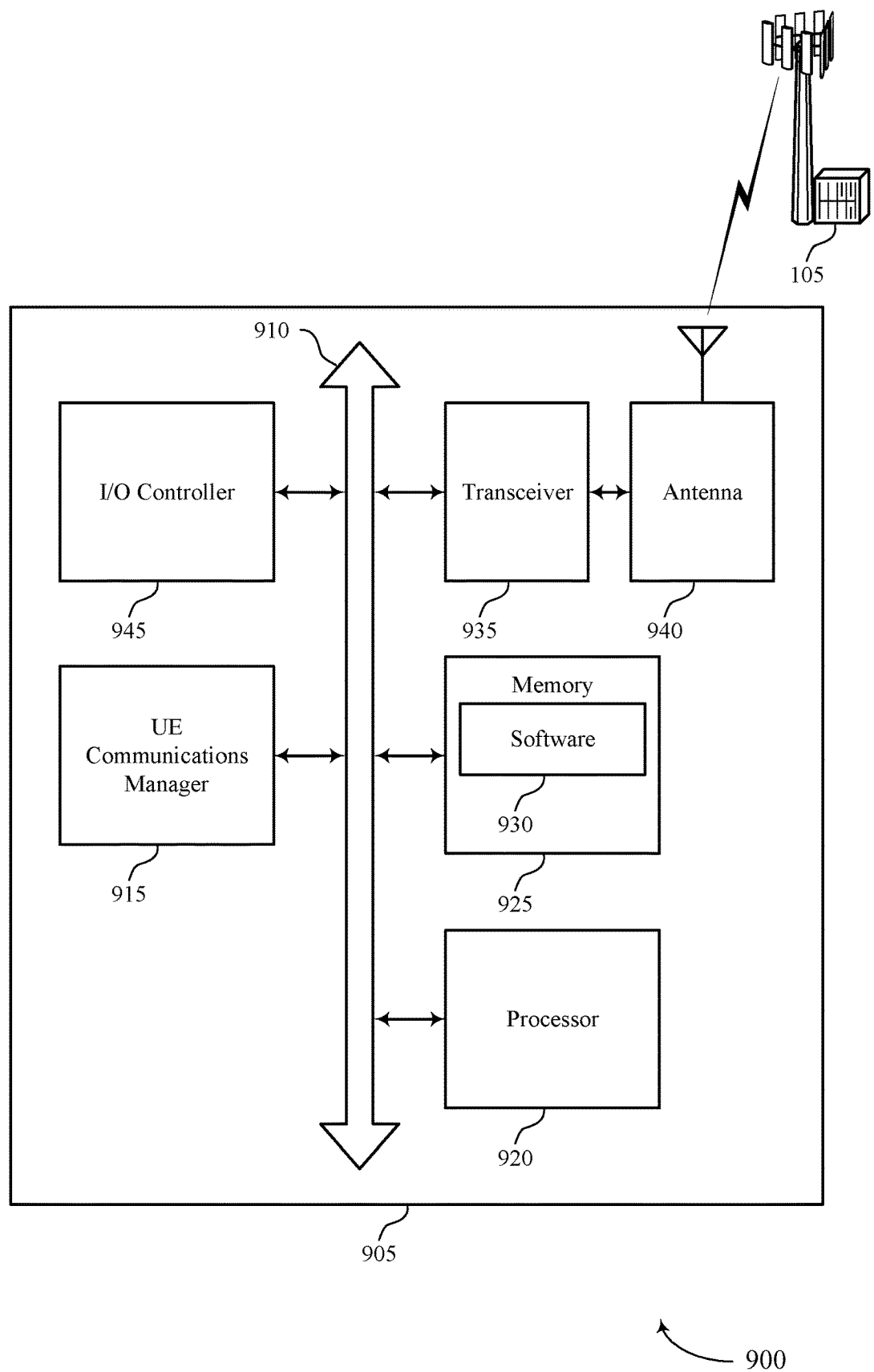
FIG. 9 illustrates a block diagram of a system including a UE that supports SPS management in NR in accordance with aspects of the present disclosure.

FIG. 9 shows a diagram of a system 900 including a device 905 that supports SPS management in NR in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting SPS management in NR).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support SPS management in NR. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
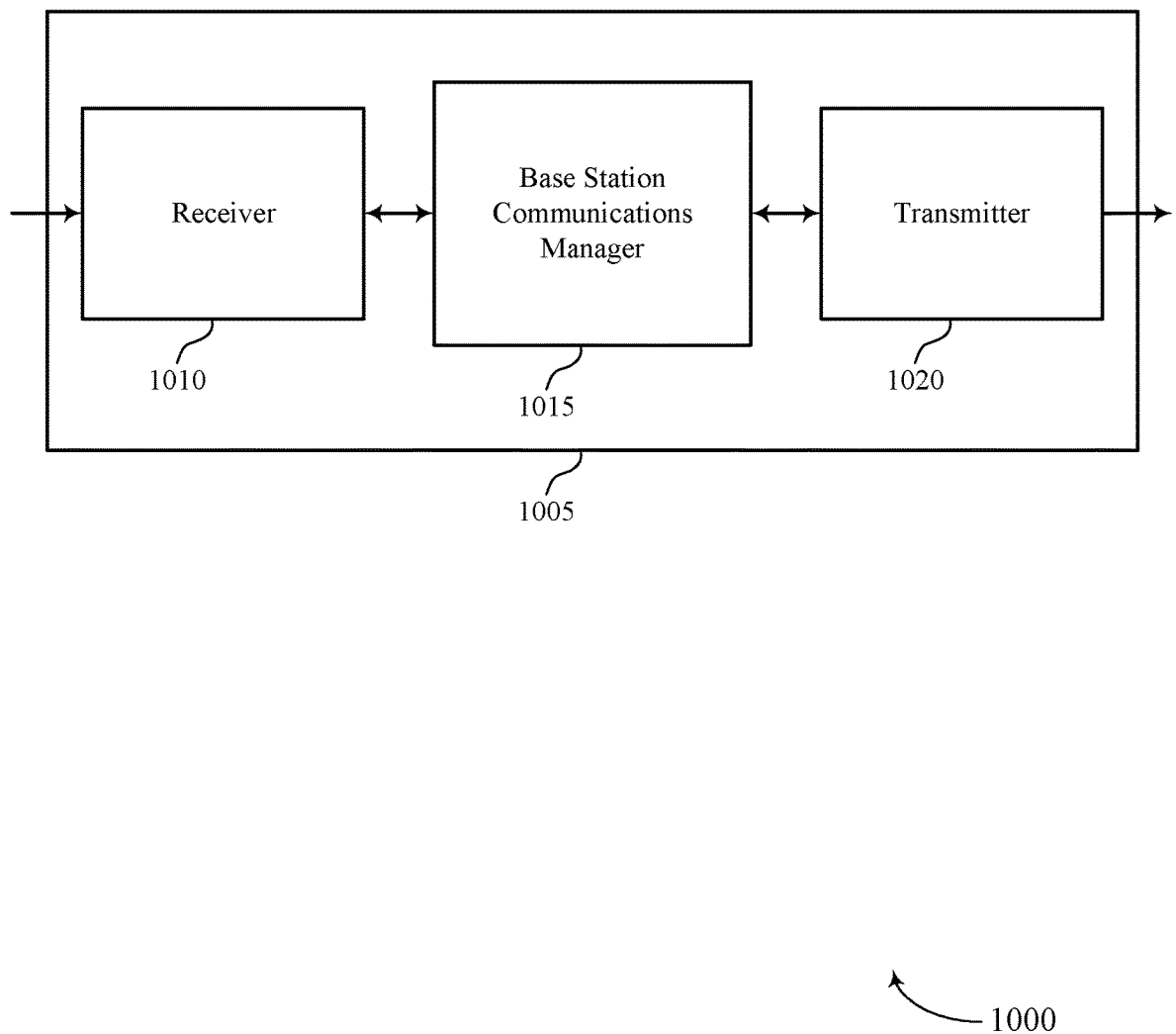
FIGS. 10 through 12 show block diagrams of a device that supports SPS management in NR in accordance with aspects of the present disclosure.

FIG. 10 shows a block diagram 1000 of a wireless device 1005 that supports SPS management in NR in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to SPS management in NR, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may establish a connection with a UE using a CC, the CC having two or more BWPs. In some cases, each BWP may have a portion of a frequency bandwidth of a primary CC. The base station communications manager 1015 may transmit signaling that indicates an SPS configuration or other types of pre-configured resources associated with at least a first BWP of the set of BWPs, and receive or transmitting using at least the first BWP according to the SPS configuration or other types of pre-configured resources associated with at least the first BWP.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
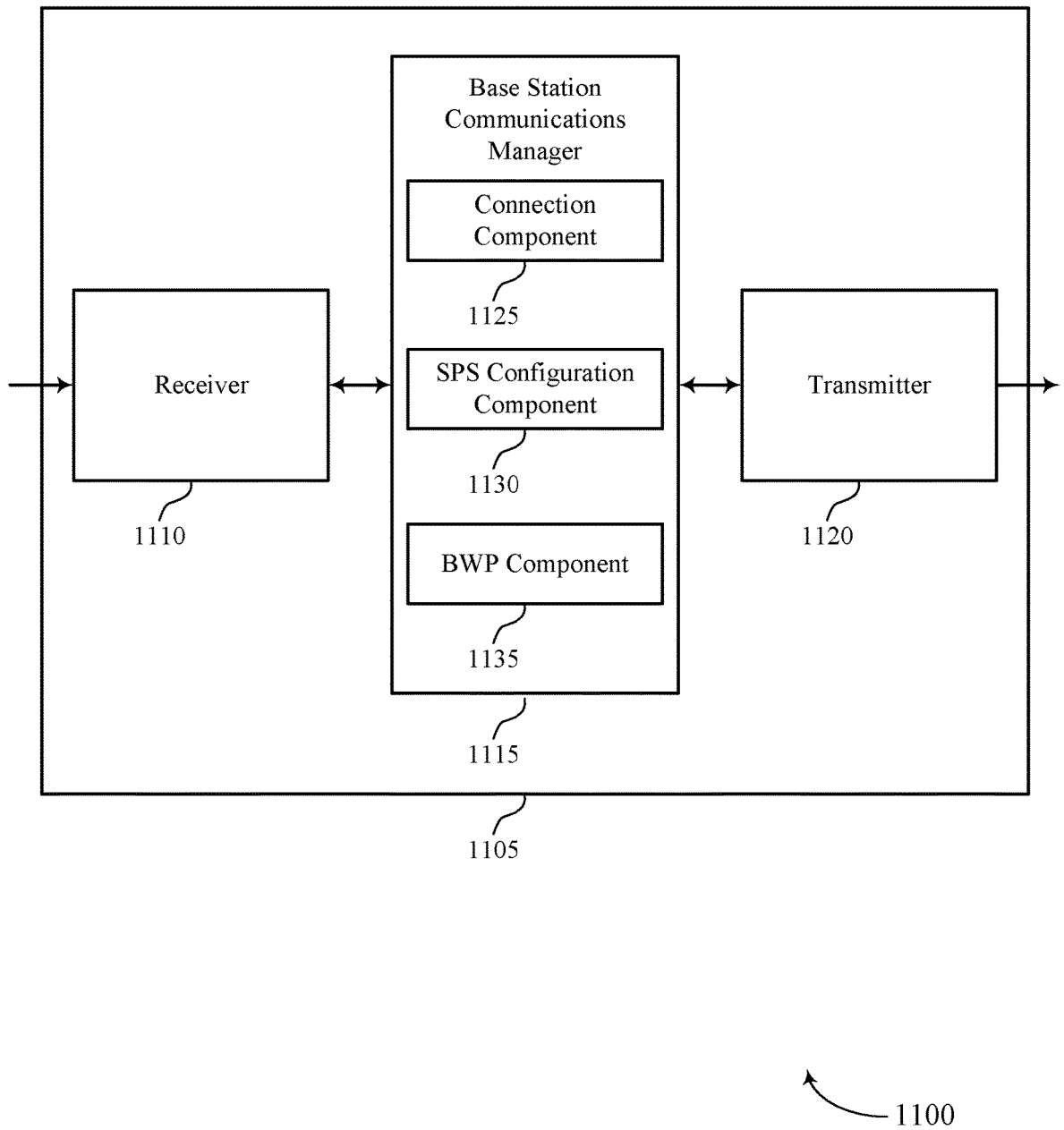

FIG. 11 shows a block diagram 1100 of a wireless device 1105 that supports SPS management in NR in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to SPS management in NR, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include connection component 1125, SPS configuration component 1130, and BWP component 1135.

Connection component 1125 may establish a connection with a UE using a CC, the CC having two or more BWPs each BWP having a portion of a frequency bandwidth of a primary CC. SPS configuration component 1130 may transmit signaling that indicates an SPS configuration or other types of pre-configured resources associated with at least a first BWP of the set of BWPs. In some cases, the signaling includes DCI or RRC messages.

BWP component 1135 may receive or transmit using at least the first BWP according to the SPS configuration or other types of pre-configured resources associated with at least the first BWP and identify a subset of BWPs from the set of BWPs that are to be associated with an SPS configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
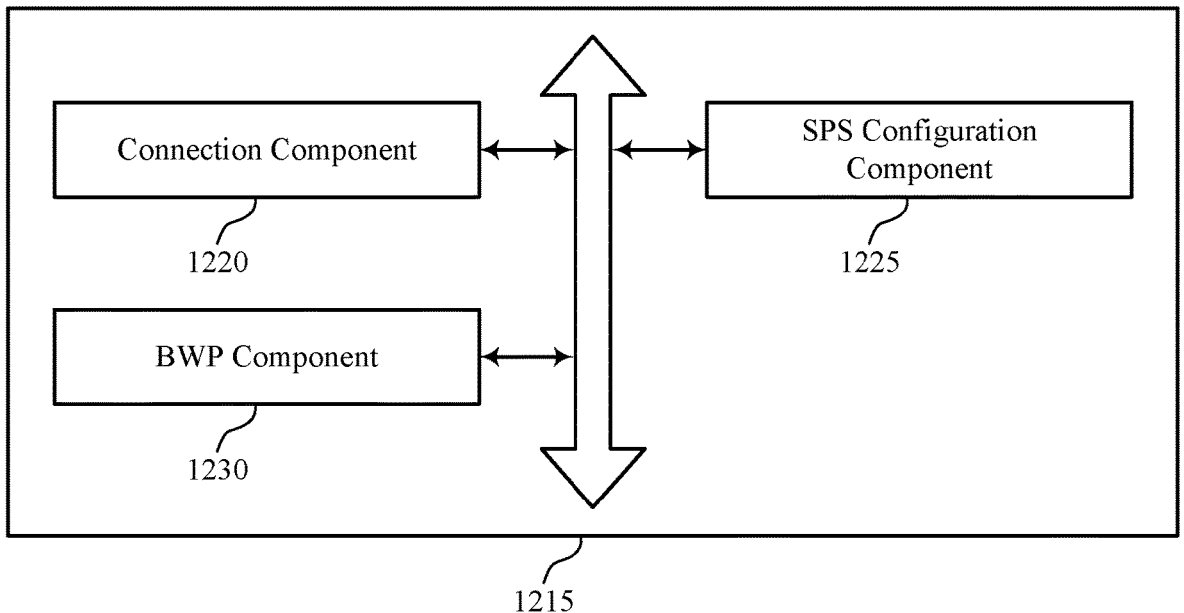

FIG. 12 shows a block diagram 1200 of a base station communications manager 1215 that supports SPS management in NR in accordance with aspects of the present disclosure. The base station communications manager 1215 may be an example of aspects of a base station communications manager 1315 described with reference to FIGS. 10, 11, and 13. The base station communications manager 1215 may include connection component 1220, SPS configuration component 1225, and BWP component 1230. Each of these modules may communicate, directly or indirectly, with one another (e.g., via one or more buses).

Connection component 1220 may establish a connection with a UE using a CC, the CC having two or more BWPs, each BWP having a portion of a frequency bandwidth of a primary CC. SPS configuration component 1225 may transmit signaling that indicates an SPS configuration or other types of pre-configured resources associated with at least a first BWP of the set of BWPs. In some cases, the signaling includes DCI or RRC messages.

BWP component 1230 may receive or transmit using at least the first BWP according to the SPS configuration or other types of pre-configured resources associated with at least the first BWP and identify a subset of BWPs from the set of BWPs that are to be associated with an SPS configuration.

Figure 13:
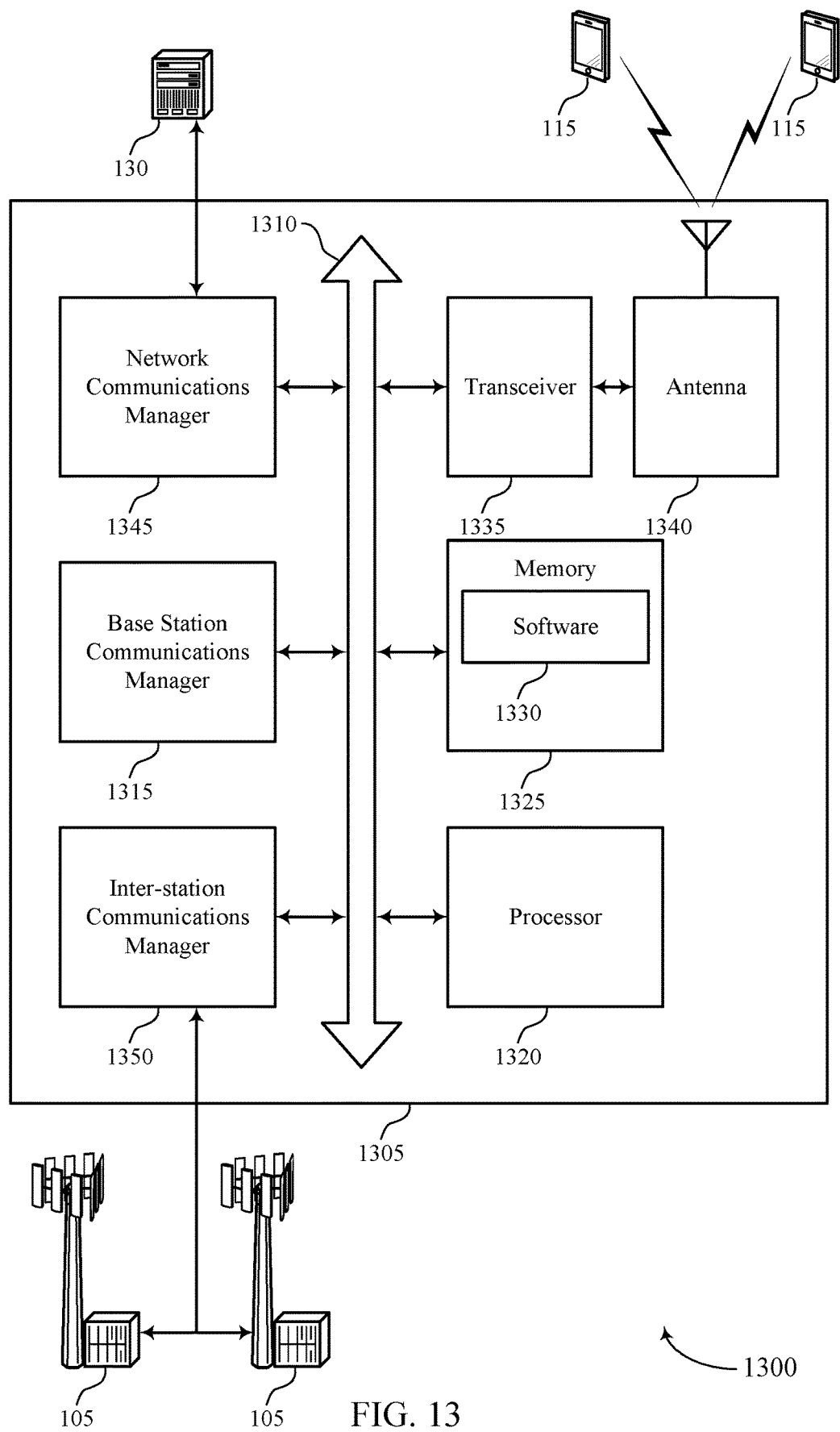
FIG. 13 illustrates a block diagram of a system including a base station that supports SPS management in NR in accordance with aspects of the present disclosure.

FIG. 13 shows a diagram of a system 1300 including a device 1305 that supports SPS management in NR in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting SPS management in NR).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support SPS management in NR. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
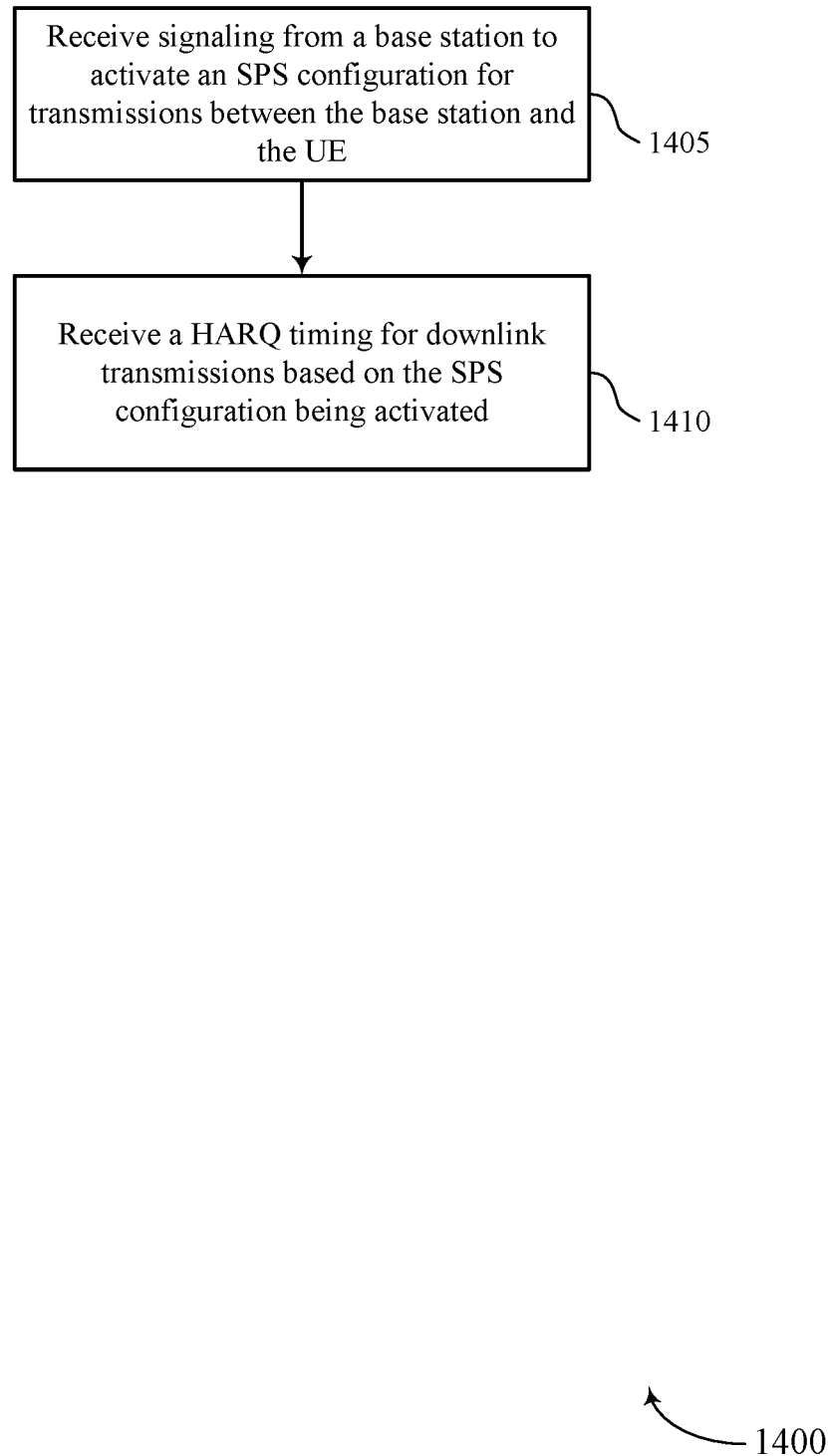
FIGS. 14 through 19 illustrate methods for SPS management in NR in accordance with aspects of the present disclosure.

FIG. 14 shows a flowchart illustrating a method 1400 for SPS management in NR in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1405 the UE 115 may receive signaling from a base station to activate an SPS configuration for transmission between the base station and the UE. The operations of 1405 may be performed according to the methods described herein. In some examples, aspects of the operations of 1405 may be performed by a SPS component as described with reference to FIGS. 6 through 9.

At 1410 the UE 115 may receive a HARQ timing for downlink transmissions based on the SPS configuration being activated. The operations of 1410 may be performed according to the methods described herein. In some examples, aspects of the operations of 1410 may be performed by a HARQ component as described with reference to FIGS. 6 through 9.

Figure 15:
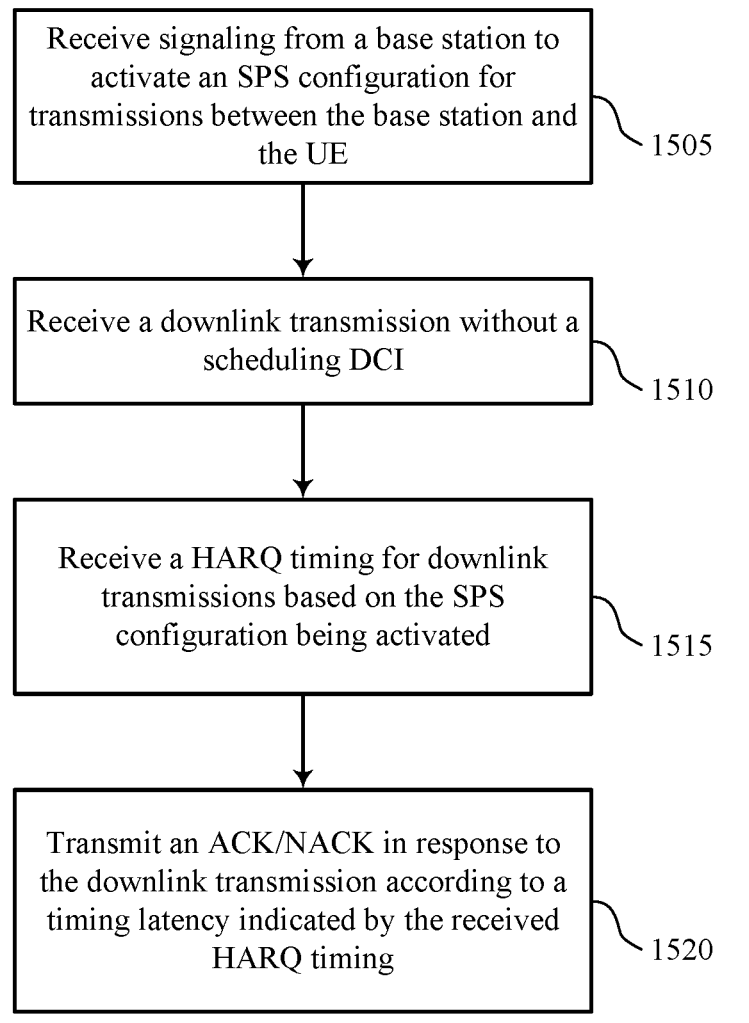

FIG. 15 shows a flowchart illustrating a method 1500 for SPS management in NR in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1505 the UE 115 may receive signaling from a base station to activate an SPS configuration for transmission between the base station and the UE. The operations of 1505 may be performed according to the methods described herein. In some examples, aspects of the operations of 1505 may be performed by a SPS component as described with reference to FIGS. 6 through 9.

At 1510 the UE 115 may receive a downlink transmission without a scheduling DCI. The operations of 1510 may be performed according to the methods described herein. In some examples, aspects of the operations of 1510 may be performed by a receiver as described with reference to FIGS. 6 through 9.

At 1515 the UE 115 may receive a HARQ timing for downlink transmissions based on the SPS configuration being activated. The operations of 1515 may be performed according to the methods described herein. In some examples, aspects of the operations of 1515 may be performed by a HARQ component as described with reference to FIGS. 6 through 9.

At 1520 the UE 115 may transmit an ACK/NACK in response to the downlink transmission according to a timing latency indicated by the received HARQ timing. The operations of 1520 may be performed according to the methods described herein. In some examples, aspects of the operations of 1520 may be performed by a transmitter as described with reference to FIGS. 6 through 9.

Figure 16:
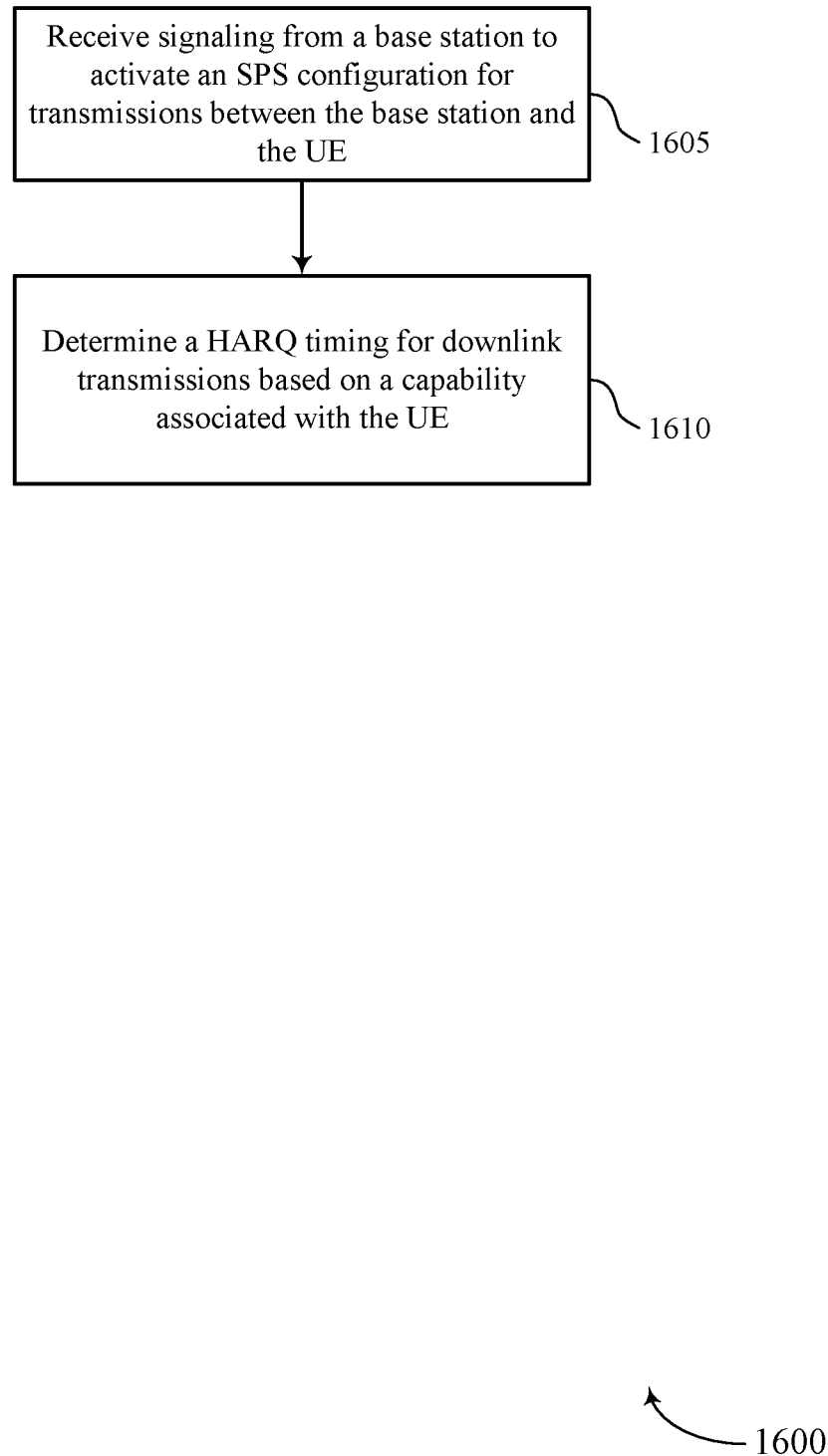

FIG. 16 shows a flowchart illustrating a method 1600 for SPS management in NR in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1605 the UE 115 may receive signaling from a base station to activate an SPS configuration for transmission between the base station and the UE. The operations of 1605 may be performed according to the methods described herein. In some examples, aspects of the operations of 1605 may be performed by a SPS component as described with reference to FIGS. 6 through 9.

At 1610 the UE 115 may determine a HARQ timing for downlink transmissions based on a capability associated with the UE. The operations of 1610 may be performed according to the methods described herein. In some examples, aspects of the operations of 1610 may be performed by a HARQ component as described with reference to FIGS. 6 through 9.

Figure 17:
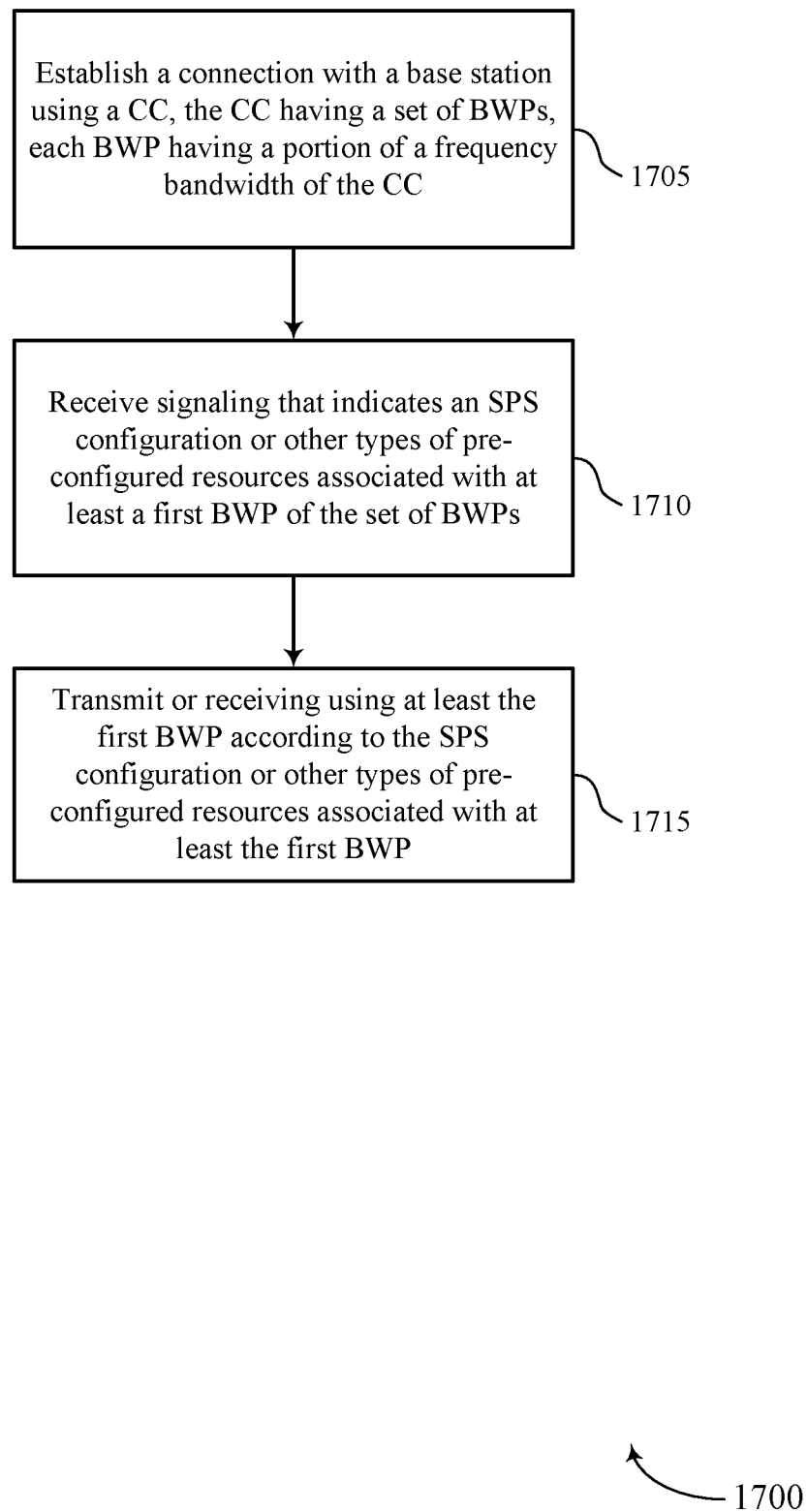

FIG. 17 shows a flowchart illustrating a method 1700 for SPS management in NR in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1705 the UE 115 may establish a connection with a base station using a CC, the CC having a plurality of BWPs, each BWP having a portion of a frequency bandwidth of the CC. The operations of 1705 may be performed according to the methods described herein. In some examples, aspects of the operations of 1705 may be performed by a connection component as described with reference to FIGS. 6 through 9.

At 1710 the UE 115 may receive signaling that indicates an SPS configuration or other types of pre-configured resources associated with at least a first BWP of the plurality of BWPs. The operations of 1710 may be performed according to the methods described herein. In some examples, aspects of the operations of 1710 may be performed by a SPS configuration component as described with reference to FIGS. 6 through 9.

At 1715 the UE 115 may transmit or receiving using at least the first BWP according to the SPS configuration or other types of pre-configured resources associated with at least the first BWP. The operations of 1715 may be performed according to the methods described herein. In some examples, aspects of the operations of 1715 may be performed by a BWP component as described with reference to FIGS. 6 through 9.

Figure 18:
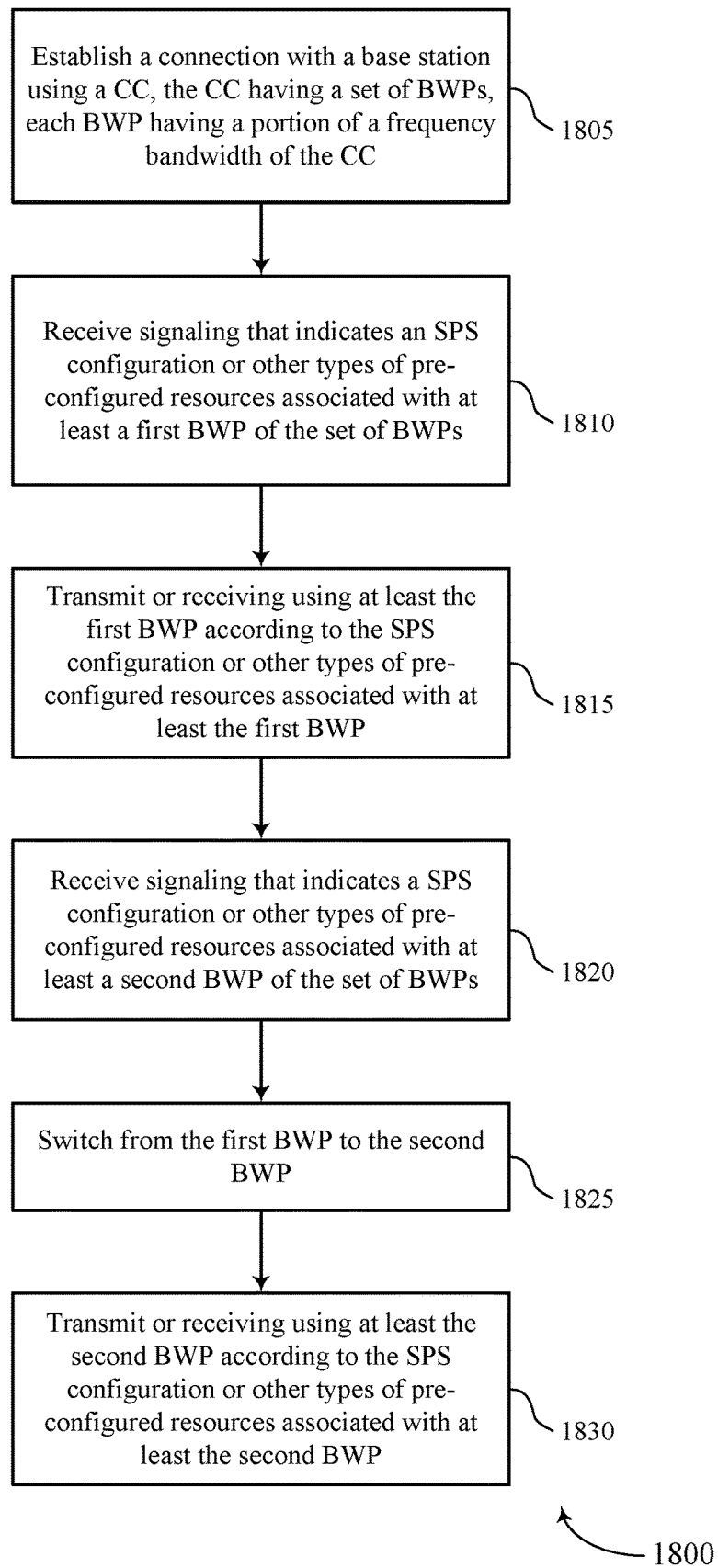

FIG. 18 shows a flowchart illustrating a method 1800 for SPS management in NR in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1805 the UE 115 may establish a connection with a base station using a CC, the CC having a plurality of BWPs, each BWP having a portion of a frequency bandwidth of the CC. The operations of 1805 may be performed according to the methods described herein. In some examples, aspects of the operations of 1805 may be performed by a connection component as described with reference to FIGS. 6 through 9.

At 1810 the UE 115 may receive signaling that indicates an SPS configuration or other types of pre-configured resources associated with at least a first BWP of the plurality of BWPs. The operations of 1810 may be performed according to the methods described herein. In some examples, aspects of the operations of 1810 may be performed by a SPS configuration component as described with reference to FIGS. 6 through 9.

At 1815 the UE 115 may transmit or receiving using at least the first BWP according to the SPS configuration or other types of pre-configured resources associated with at least the first BWP. The operations of 1815 may be performed according to the methods described herein. In some examples, aspects of the operations of 1815 may be performed by a BWP component as described with reference to FIGS. 6 through 9.

At 1820 the UE 115 may receive signaling that indicates a SPS configuration or other types of pre-configured resources associated with at least a second BWP of the plurality of BWPs. The operations of 1820 may be performed according to the methods described herein. In some examples, aspects of the operations of 1820 may be performed by a SPS configuration component as described with reference to FIGS. 6 through 9.

At 1825 the UE 115 may switch from the first BWP to the second BWP. The operations of 1825 may be performed according to the methods described herein. In some examples, aspects of the operations of 1825 may be performed by a switching component as described with reference to FIGS. 6 through 9.

At 1830 the UE 115 may transmit or receiving using at least the second BWP according to the SPS configuration or other types of pre-configured resources associated with at least the second BWP. The operations of 1830 may be performed according to the methods described herein. In some examples, aspects of the operations of 1830 may be performed by a BWP component as described with reference to FIGS. 6 through 9.

Figure 19:
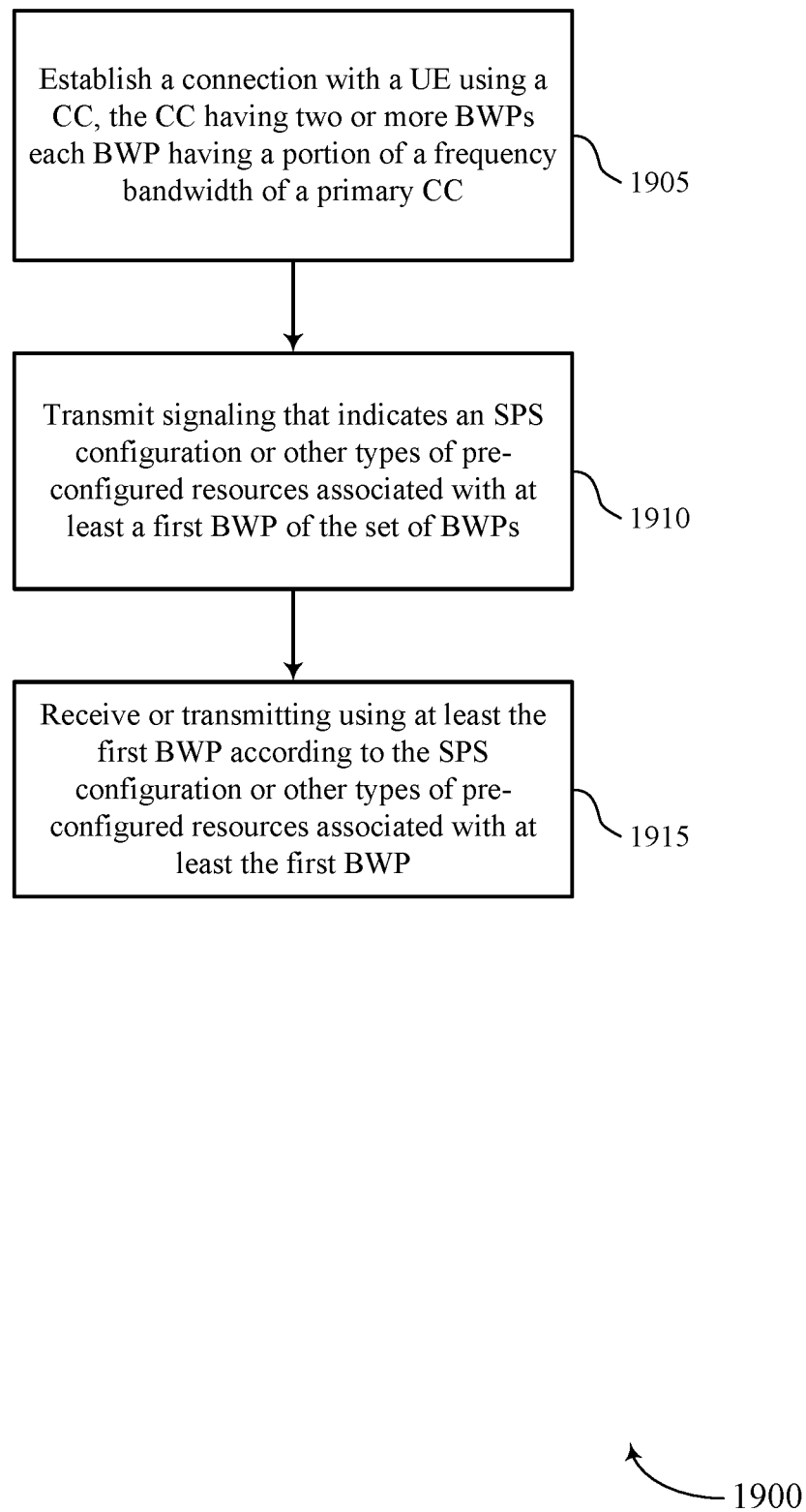

FIG. 19 shows a flowchart illustrating a method 1900 for SPS management in NR in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally, or alternatively, the base station 105 may perform aspects of the functions described below using special-purpose hardware.

At 1905 the base station 105 may establish a connection with a UE using a CC, the CC having two or more BWPs each BWP having a portion of a frequency bandwidth of a primary CC. The operations of 1905 may be performed according to the methods described herein. In some examples, aspects of the operations of 1905 may be performed by a connection component as described with reference to FIGS. 10 through 13.

At 1910 the base station 105 may transmit signaling that indicates an SPS configuration or other types of pre-configured resources associated with at least a first BWP of the plurality of BWPs. The operations of 1910 may be performed according to the methods described herein. In some examples, aspects of the operations of 1910 may be performed by a SPS configuration component as described with reference to FIGS. 10 through 13.

At 1915 the base station 105 may receive or transmitting using at least the first BWP according to the SPS configuration or other types of pre-configured resources associated with at least the first BWP. The operations of 1915 may be performed according to the methods described herein. In some examples, aspects of the operations of 1915 may be performed by a BWP component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving signaling from a base station to activate a semi-persistent scheduling (SPS) configuration that is specific to a bandwidth part configured for the UE, the SPS configuration for transmission between the base station and the UE over the bandwidth part; and
   determining a hybrid automatic repeat request (HARQ) timing for downlink transmissions based at least in part on the SPS configuration being activated and a HARQ timing value that is specific to the bandwidth part configured for the UE and indicated by radio resource control signaling.

2. The method of claim 1, further comprising:
   receiving a downlink transmission without a scheduling downlink control information (DCI); and
   transmitting an acknowledgement (ACK)/non-acknowledgement (NACK) in response to the downlink transmission according to a timing latency indicated by the HARQ timing.

3. The method of claim 1, further comprising:
   receiving the HARQ timing via the radio resource control signaling from the base station.

4. The method of claim 3, further comprising:
   receiving signaling from the base station to activate a second SPS configuration for a second transmission between the base station and the UE; and
   receiving a second HARQ timing via RRC signaling, the second HARQ timing associated with the second SPS configuration.

5. The method of claim 1, wherein the HARQ timing is based at least in part on a capability of the UE.

6. The method of claim 5, wherein the capability associated with the UE is based at least in part on a capability profile for the UE, wherein the capability profile indicates a minimum value of the HARQ timing supported by the UE.

7. The method of claim 1, wherein the signaling to activate the SPS configuration comprises an activation downlink control information (DCI).

8. The method of claim 7, further comprising:
   receiving an indication of the HARQ timing via the activation DCI, the activation DCI including a physical downlink shared channel (PDSCH).

9. The method of claim 8, wherein the HARQ timing is applied to the PDSCH with the activation DCI and subsequent transmissions of PDSCH without a DCI.

10. The method of claim 7, further comprising:
    receiving a second activation DCI that indicates a second HARQ timing, the second HARQ timing replacing the previously determined HARQ timing.

11. The method of claim 1, wherein the HARQ timing is a function of at least one of a slot structure, or a bandwidth part switching procedure, or a combination thereof.

12. The method of claim 11, wherein the slot structure comprises an uplink transmission opportunity for transmitting an acknowledgement (ACK)/non-acknowledgement (NACK) in response to a downlink transmission.

13. The method of claim 12, wherein the slot structure is dynamically indicated by at least one slot-format-indicator (SFI).

14. An apparatus for wireless communication at a user equipment (UE), comprising:
    a processor;
    memory in electronic communication with the processor; and
    instructions stored in the memory and executable by the processor to cause the apparatus to:
      receive signaling from a base station to activate a semi-persistent scheduling (SPS) configuration that is specific to a bandwidth part configured for the UE, the SPS configuration for transmission between the base station and the UE over the bandwidth part; and
      determine a hybrid automatic repeat request (HARQ) timing for downlink transmissions based at least in part on the SPS configuration being activated and a HARQ timing value that is specific to the bandwidth part configured for the UE and indicated by radio resource control signaling.

15. The apparatus of claim 14, further comprising:
    a receiver in electronic communication with the processor, wherein the instructions are further executable by the processor to cause the receiver to receive a downlink transmission without a scheduling downlink control information (DCI); and
    a transmitter in electronic communication with the processor, wherein the instructions are further executable by the processor to cause the transmitter to transmit an acknowledgement (ACK)/non-acknowledgement (NACK) in response to the downlink transmission according to a timing latency indicated by the HARQ timing.

16. The apparatus of claim 14, wherein the instructions are further executable by the processor to cause the apparatus to:
    receive the HARQ timing via the radio resource control signaling from the base station.

17. The apparatus of claim 16, wherein the instructions are further executable by the processor to cause the apparatus to:
    receive signaling from the base station to activate a second SPS configuration for a second transmission between the base station and the UE; and
    receive a second HARQ timing via RRC signaling, the second HARQ timing associated with the second SPS configuration.

18. The apparatus of claim 14, wherein the HARQ timing is based at least in part on a capability of the UE.

19. The apparatus of claim 18, wherein the capability associated with the UE is based at least in part on a capability profile for the UE, wherein the capability profile indicates a minimum value of the HARQ timing supported by the UE.

20. The apparatus of claim 14, wherein the signaling to activate the SPS configuration comprises an activation downlink control information (DCI).

21. The apparatus of claim 20, wherein the instructions are further executable by the processor to cause the apparatus to:
   receive an indication of the HARQ timing via the activation DCI, the activation DCI including a physical downlink shared channel (PDSCH).

22. The apparatus of claim 21, wherein the HARQ timing is applied to the PDSCH with the activation DCI and subsequent transmissions of PDSCH without a DCI.

23. The apparatus of claim 20, wherein the instructions are further executable by the processor to cause the apparatus to:
   receive a second activation DCI that indicates a second HARQ timing, the second HARQ timing replacing the previously determined HARQ timing.

* * * * *